(12) United States Patent
Emori

(10) Patent No.: US 12,316,953 B2
(45) Date of Patent: May 27, 2025

(54) IMAGING APPARATUS AND METHOD OF CONTROLLING IMAGING APPARATUS TO DISPLAY FOCAL LENGTH

(71) Applicant: SONY GROUP CORPORATION, Tokyo (JP)

(72) Inventor: Tomoyuki Emori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 103 days.

(21) Appl. No.: 18/027,596

(22) PCT Filed: Jun. 11, 2021

(86) PCT No.: PCT/JP2021/022309
§ 371 (c)(1),
(2) Date: Mar. 21, 2023

(87) PCT Pub. No.: WO2022/079945
PCT Pub. Date: Apr. 21, 2022

(65) Prior Publication Data
US 2023/0379570 A1    Nov. 23, 2023

(30) Foreign Application Priority Data
Oct. 16, 2020  (JP) ................................. 2020-174342

(51) Int. Cl.
*H04N 23/63*     (2023.01)
(52) U.S. Cl.
CPC ......... *H04N 23/632* (2023.01); *H04N 23/633* (2023.01)

(58) Field of Classification Search
CPC .. H04N 23/632; H04N 23/633; H04N 23/631; H04N 23/667; H04N 23/67; G03B 17/18
See application file for complete search history.

(56) References Cited

U.S. PATENT DOCUMENTS

| 8,649,574 B2 * | 2/2014 | Mise ...................... H04N 23/61 |
| | | 348/222.1 |
| 2009/0195666 A1 * | 8/2009 | Chen ...................... H04N 23/90 |
| | | 348/222.1 |
| 2016/0309091 A1 * | 10/2016 | Kigure ................. H04N 23/635 |
| 2019/0089908 A1 * | 3/2019 | Matsunaga ............ H04N 5/268 |

FOREIGN PATENT DOCUMENTS

| JP | 2001-326834 A | 11/2001 |
| JP | 2002-281358 A | 9/2002 |
| JP | 2016-206250 A | 12/2016 |
| JP | 2020-012890 A | 1/2020 |

OTHER PUBLICATIONS

International Search Report and Written Opinion of PCT Application No. PCT/JP2021/022309, issued on Sep. 14, 2021, 11 pages of ISRWO.

* cited by examiner

*Primary Examiner* — Gevell V Selby
(74) *Attorney, Agent, or Firm* — CHIP LAW GROUP

(57) ABSTRACT

For example, a more user-friendly display is performed for the focus at the time of rehearsal. The present invention relates to an imaging apparatus including a focal length display control unit that performs control to display, on a display unit, a current focal length indicating a position currently in focus and a plurality of focal lengths at preliminary shooting indicating positions in focus at preliminary shooting and displayed in order of being in focus.

20 Claims, 22 Drawing Sheets

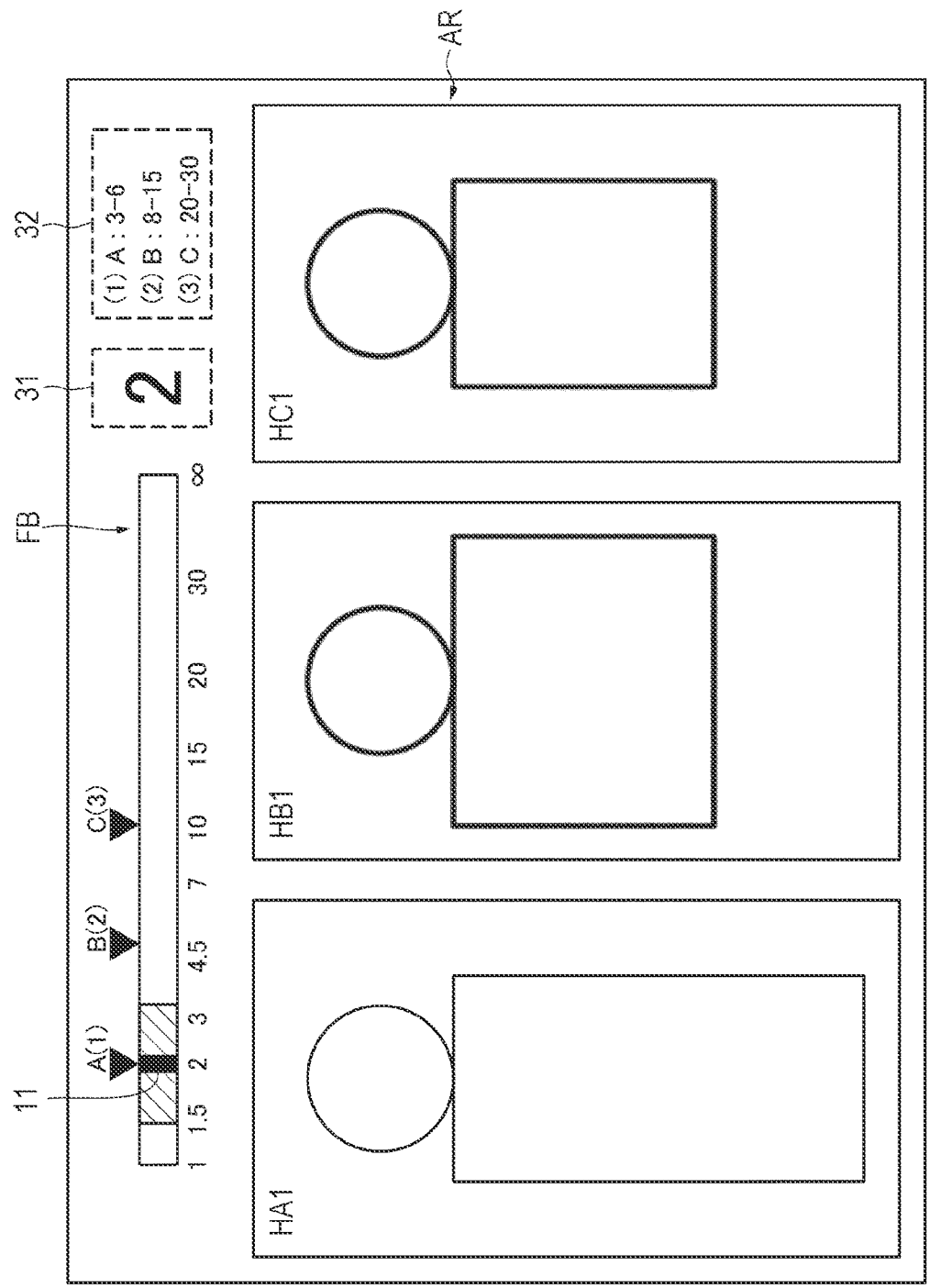

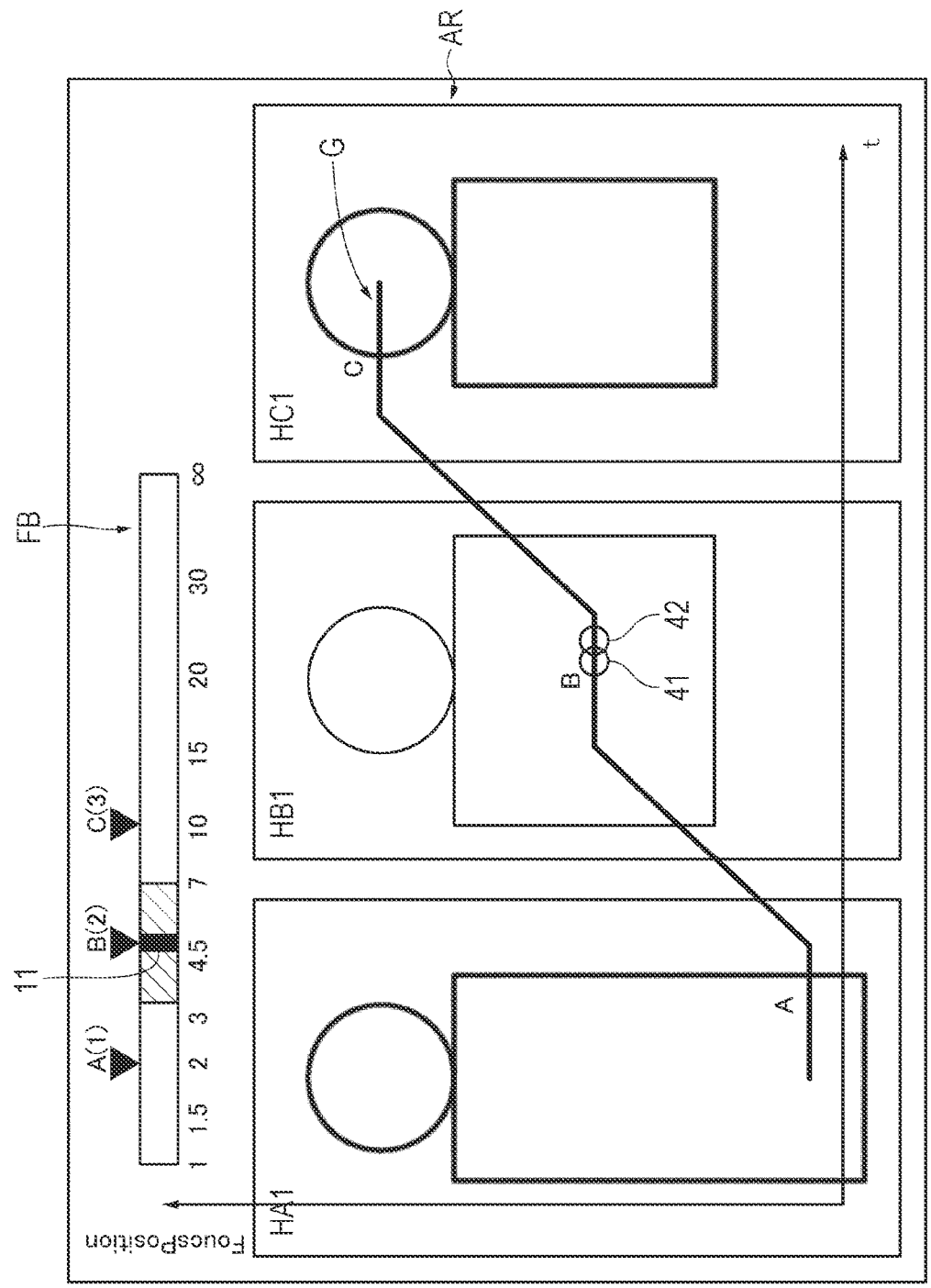

IMAGING APPARATUS AND METHOD OF CONTROLLING IMAGING APPARATUS TO DISPLAY FOCAL LENGTH

CROSS REFERENCE TO RELATED APPLICATIONS

This application is a U.S. National Phase of International Patent Application No. PCT/JP2021/022309 filed on Jun. 11, 2021, which claims priority benefit of Japanese Patent Application No. JP 2020-174342 filed in the Japan Patent Office on Oct. 16, 2020. Each of the above-referenced applications is hereby incorporated herein by reference in its entirety.

TECHNICAL FIELD

The present disclosure relates to an imaging apparatus, a method of controlling the imaging apparatus, and a program.

BACKGROUND ART

Patent document 1 discloses a technology for displaying a rehearsal image. Furthermore, patent document 2 discloses a technology for displaying a marker (symbol) on a focus bar. With these technologies, it is possible to perform shooting with focus and angle of view similar to those at the time of rehearsal.

CITATION LIST

Patent Document

Patent Document 1: Japanese Patent Application Laid-Open No. 2002-281358
Patent Document 2: Japanese Patent Application Laid-Open No. 2001-326834

SUMMARY OF THE INVENTION

Problems to be Solved by the Invention

However, with the technologies described in the above-described patent documents, it has not been possible to perform a more user-friendly display for the focus at the time of rehearsal.

One object of the present disclosure is to provide an imaging apparatus, a method of controlling the imaging apparatus, and a program for performing a more user-friendly display for the focus at the time of rehearsal.

Solutions to Problems

For example, the present disclosure is
an imaging apparatus including a focal length display control unit that performs control to display, on a display unit, a current focal length indicating the current focal length and a plurality of focal lengths at preliminary shooting indicating the focal lengths recorded at preliminary shooting and displayed in order of registration at preliminary shooting.
Furthermore, for example, the present disclosure is
a method of controlling the imaging apparatus in which the focal length display control unit performs control to display, on the display unit, a current focal length indicating a current focal length and a plurality of focal lengths at preliminary shooting indicating the focal lengths recorded at preliminary shooting and displayed in order of registration at preliminary shooting.
Furthermore, for example, the present disclosure is
a program for causing a computer to execute the method of controlling the imaging apparatus in which the focal length display control unit performs control to display, on the display unit, a current focal length indicating a current focal length and a plurality of focal lengths at preliminary shooting indicating the focal lengths recorded at preliminary shooting and displayed in order of registration at preliminary shooting.

BRIEF DESCRIPTION OF DRAWINGS

FIG. 5 is a flowchart for explaining an example of processing of displaying a current focal length and the like.
FIG. 15 is a diagram to be referred to in describing a seventh example of the display method of a current focal length and a focal length at preliminary shooting.
FIG. 16 is a diagram to be referred to in describing an eighth example of the display method of a current focal length and a focal length at preliminary shooting.

MODE FOR CARRYING OUT THE INVENTION

Hereinafter, an embodiment and the like of the present disclosure will be described with reference to the drawings. Note that the description will be given in the following order.

Overview of Present Disclosure

One Embodiment

Modifications

The embodiment and the like described below are preferred specific examples of the present disclosure, and the content of the present disclosure is not limited to this embodiment and the like.

Overview of Present Disclosure

First, in order to facilitate understanding of the present disclosure, an overview of the present disclosure will be described. Generally, in shooting of a movie or a drama, rehearsal shooting is performed before real shooting. If a focal length at the time of rehearsal can be used in real shooting, a video substantially similar to a video at the time of rehearsal can be obtained in real shooting. Therefore, for example, a current focal length indicating the current focal length and a plurality of focal lengths at preliminary shooting indicating the focal lengths recorded at preliminary shooting and displayed in order of registration at preliminary shooting are displayed on a display unit. Note that a focal length can be specified by various methods such as a method of detecting the position of a lens in addition to information on how much a lens is driven, and can also be referred to as a focal position.

Furthermore, in news coverage shooting, although detailed rehearsal is not performed as much as in shooting such as drama shooting, there is a case where manual operation of focusing is checked in advance by pointing a camera at a subject as a point before real shooting. In such a case, an image of a subject as a point to be shot and a focal length at that time are recorded in the camera main body during the advance checking of focusing operation before shooting, and the focal length and the image at the focal length are displayed on the viewfinder in real shooting, so that a shooter can easily perform focusing with the focal length and the image as targets.

As described above, for example, the present disclosure displays, on the display unit, a current focal length indicating the current focal length and a plurality of focal lengths at preliminary shooting indicating the focal lengths recorded at preliminary shooting and displayed in order of registration at preliminary shooting. Hereinafter, the embodiment of the present disclosure will be described in detail.

One Embodiment

Configuration Example of Imaging Apparatus

Figure 1:
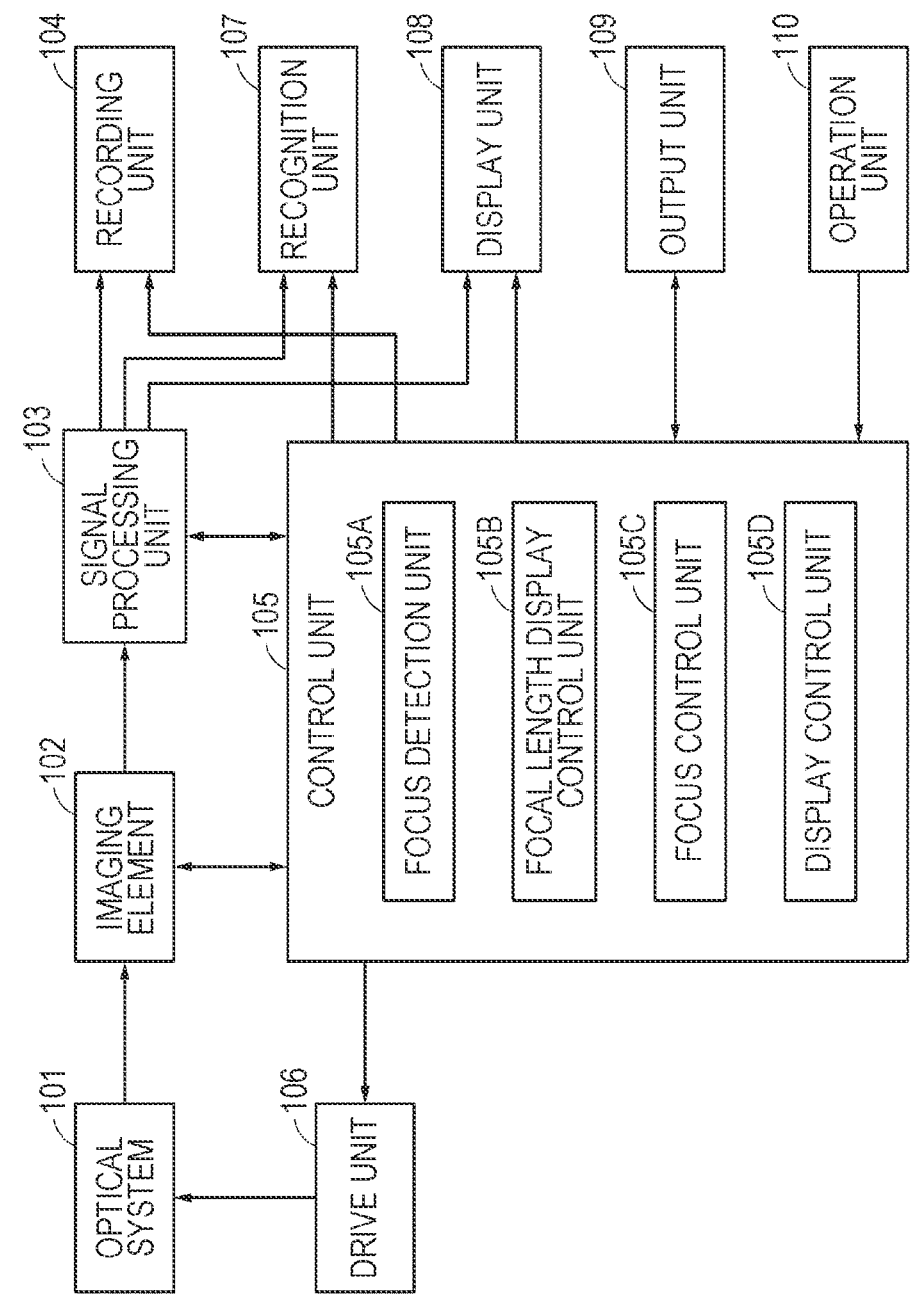
FIG. 1 is a block diagram for explaining a configuration example of an imaging apparatus according to an embodiment.

First, a configuration example of an imaging apparatus (imaging apparatus 1) according to the embodiment will be described with reference to FIG. 1. The imaging apparatus 1 has an optical system 101, an imaging element 102, a signal processing unit 103, a recording unit 104, a control unit 105, a drive unit 106, a recognition unit 107, a display unit 108, an output unit 109, and an operation unit 110. The control unit 105 has, as functional blocks, a focus detection unit 105A, a focal length display control unit 105B, a focus control unit 105C, and a display control unit 105D.

The optical system 101 includes an imaging lens and the like for condensing light from a subject on the imaging element 102. In general, the optical system 101 has a plurality of lenses such as an incident end lens, a zoom lens, a focus lens, and a condenser lens.

The imaging element 102 includes an imaging element that photoelectrically converts incident light from a subject obtained through the optical system 100, converts the light into a charge amount, and outputs an imaging signal, and an image signal processing unit that performs known image processing for correcting a gain or luminance. As the imaging element, a charge coupled device (CCD), a complementary metal oxide semiconductor (CMOS), or the like is used.

The signal processing unit 103 performs sample-and-hold for maintaining a favorable signal/noise (S/N) ratio by correlated double sampling (CDS) processing, auto gain control (AGC) processing, analog/digital (A/D) conversion, and the like on the imaging signal output from the imaging element 102, and generates an image signal.

The recording unit 104 is a storage medium such as a hard disk or a flash memory. Video data recorded in the recording unit 104 is saved in a compressed state or an uncompressed state on the basis of a predetermined standard. Control of recording in the recording unit 104 and control of reading from the recording unit 104 are performed by the control unit 105. The recording unit 104 records shot video data, a focal length at preliminary shooting to be described later, information related to the focal length at preliminary shooting including at least one of a thumbnail image corresponding to the focal length at preliminary shooting or a focal length transition required time, and the like.

The control unit 105 integrally controls the imaging apparatus 1. The focus detection unit 105A detects a focal length. A focal length may be detected on the basis of a signal indicating how much a lens is driven by the focus control unit 105C, may be detected on the basis of a lens position, or may be detected on the basis of edge detection information or depth information. Furthermore, a focal length may be detected for each frame, or may be detected in a case where it is detected that the position of a lens included in the optical system 101 has moved.

The focal length display control unit 105B performs control to display, on the display unit 108, a current focal length indicating the current focal length and a plurality of focal lengths at preliminary shooting indicating the focal lengths recorded at preliminary shooting and displayed in order of registration at preliminary shooting.

The focus control unit 105C generates focus control data for performing focus control. The focus control unit 105C generates control data in a case where autofocus is operated, or in a case where manual focus for controlling focus on the basis of a user operation is operated in a case where a user performs an operation related to focus on the operation unit 110.

The display control unit 105D performs control to display, on the display unit 108, the image signal subjected to the signal processing by the signal processing unit 103, the video data recorded in the recording unit 104, and the like.

The drive unit 106 acquires focus control data by performing communication with the control unit 105, and performs autofocus so as to focus on a target subject by moving a lens by a predetermined amount along the optical axis direction on the basis of the focus control data. Furthermore, in accordance with the control from the control unit 105, the operation of the drive mechanism, shutter mechanism, iris mechanism, and the like of the optical system 101 is controlled. As a result, exposure time (shutter speed) is adjusted, and aperture value (F value) and the like are adjusted.

The recognition unit 107 performs subject recognition on the basis of the image signal subjected to the signal processing by the signal processing unit 103. For example, as a result of the subject recognition by the recognition unit 107, the recognized subject is associated with the focal length obtained when the subject is focused.

The display unit 108 is a display device such as a display that displays a live view image which is an image signal for display subjected to processing for display, an image/video which is subjected to image processing for recording and saved in the recording unit 104, a graphical user interface (GUI), and the like.

The output unit 109 is an interface with another device, the Internet, or the like. The output unit 109 may include a wired or wireless communication interface. Furthermore, more specifically, the wired or wireless communication interface may include cellular communication such as 3TTE, Wi-Fi, Bluetooth (registered trademark), near field communication (NFC), Ethernet (registered trademark), high-definition multimedia interface (HDMI) (registered trademark), universal serial bus (USB), and the like.

Note that the imaging apparatus 1 may include a communication unit capable of connecting to the Internet, other devices, or the like, such as a wireless local area network (LAN), a wide area network (WAN), or wireless fidelity (WiFi). Furthermore, communication between the imaging apparatus 1 and the external device may be short-range wireless communication such as near field communication (NFC) or ZigBee (registered trademark), or tethering connection such as WiFi tethering, universal serial bus (USB) tethering, or Bluetooth (registered trademark) tethering.

The operation unit 110 is used by a user to give various instructions, for example, to the imaging apparatus 1. If an operation input is made to the operation unit 110 from the user, a control signal corresponding to the operation input is generated and supplied to the control unit 105. Then, the control unit 105 performs various processing corresponding to the control signal. Examples of the operation unit 110 include a shutter button for shutter input, a physical button for various kinds of operation, a touch panel, a touch screen integrally configured with a display as the display unit 108, a microphone for receiving voice input, and the like. Furthermore, the operation unit 110 includes a focus ring used for manual focus. Note that manual focus may be set by a touch panel or a button type operation mechanism.

Although a configuration example of the imaging apparatus 1 has been described above, the configuration of the imaging apparatus 1 can be changed as appropriate. For example, the imaging apparatus 1 may include a sensor that acquires depth information, or may include a communication unit that communicates with another device.

Operation Example of Imaging Apparatus

Operation Example in Preliminary Shooting

Figure 2:
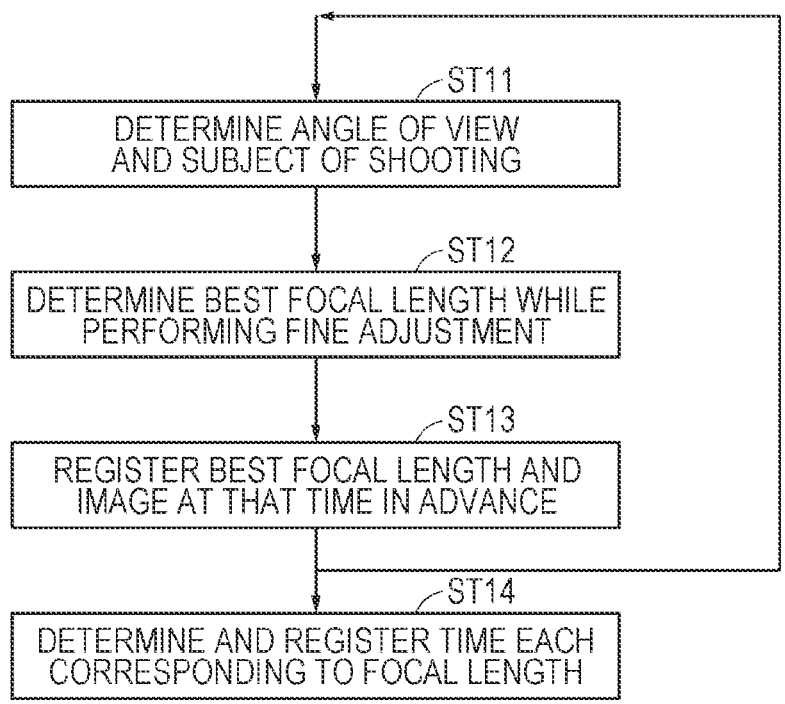
FIG. 2 is a flowchart for explaining a workflow performed by a user at preliminary shooting.

Next, an operation example of the imaging apparatus 1 will be described. First, an operation example of the imaging apparatus 1 in preliminary shooting will be described with reference to the flowchart illustrated in FIG. 2. Preliminary shooting may be rehearsal shooting, or may be shooting performed before rehearsal shooting. The flowchart illustrated in FIG. 2 is a flow of a workflow performed by a focus puller in charge of focusing, for example.

In step ST11, the angle of view and the subject of shooting are determined. Then, the processing proceeds to step ST12.

In step ST12, the most appropriate focal length is determined. For example, the focus ring of the imaging apparatus 1 is operated as appropriate, and the focal length is determined while being finely adjusted. Then, the processing proceeds to step ST13.

In step ST13, operation is performed in which the best focal length and an image corresponding to the focal length are registered in the imaging apparatus 1 in advance. A trigger is given by this operation. Operation is given a trigger for the operation of pressing an assignable switch, a voice input, or the like. This registered focal length is a focal length at preliminary shooting.

In step ST14, time corresponding to the focal length at preliminary shooting is determined and registered. For example, such time is elapsed time from the storage start timing. For example, the time corresponding to the focal length at preliminary shooting is stored in the recording unit 104 in association with image data corresponding to the focal length at preliminary shooting.

Note that a plurality of focal lengths at preliminary shooting may be set. In this case, the above-described processing is repeated by the number of focal lengths at preliminary shooting. In the following description, unless otherwise specified, it is assumed that three focal lengths at preliminary shooting (focal length at preliminary shooting A, focal length at preliminary shooting B, and focal length at preliminary shooting C) are set.

Figure 3:
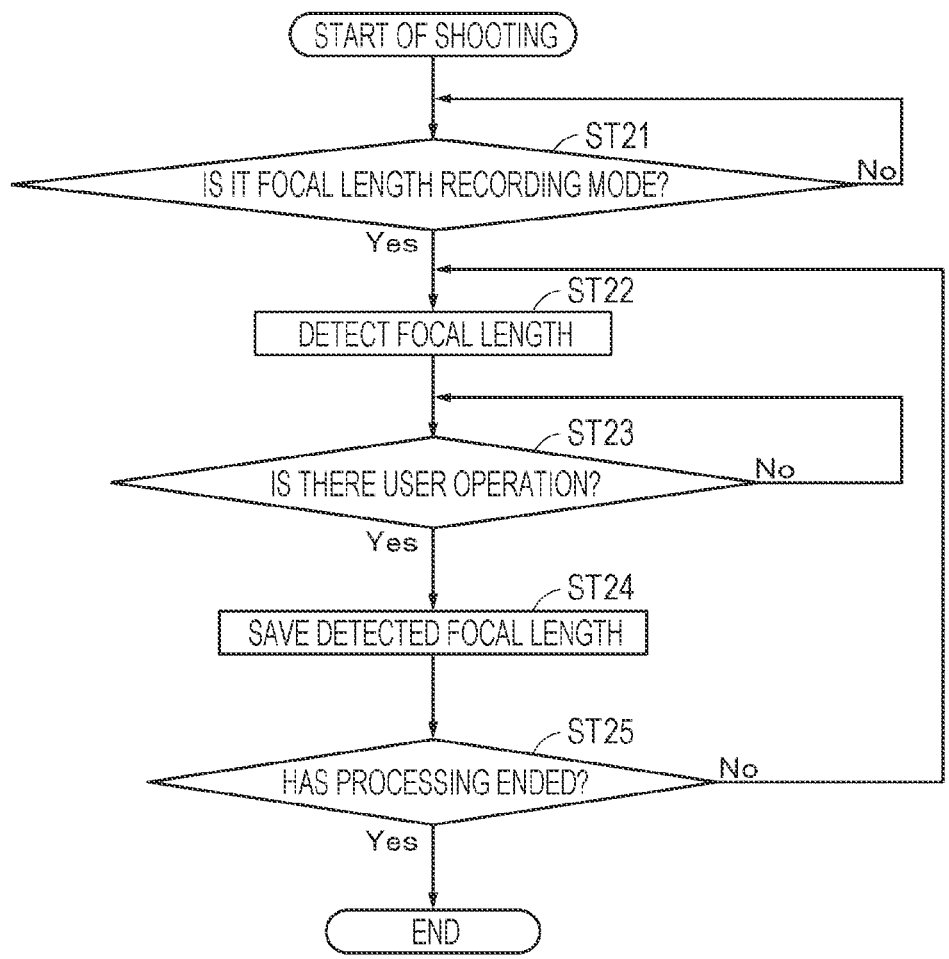
FIG. 3 is a flowchart for explaining an example of processing performed by the imaging apparatus at preliminary shooting.

FIG. 3 is a flowchart illustrating a flow of specific processing performed by the imaging apparatus 1 in response to the above-described operation.

In step ST21, the control unit 105 determines whether or not the mode of the imaging apparatus 1 is the focal length recording mode of recording the focal length. In a case where the mode of the imaging apparatus 1 is not the focal length recording mode, the processing of step ST21 is repeated. In a case where the mode of the imaging apparatus 1 is the focal length recording mode, the processing proceeds to step ST22.

In step ST22, the focus detection unit 105A detects a focal length. The detection of a focal length may be performed for each frame, may be performed in a case where a change in the position of a lens included in the optical system 101 is detected, or may be performed at other timings. Then, the processing proceeds to step ST23.

In step ST23, it is determined whether or not there is user operation. Such user operation is operation for recording a focal length. For example, the control unit 105 determines whether or not there is user operation on the basis of the presence or absence of an operation signal from the operation unit 110. In a case where there is no user operation, the processing returns to step ST23. In a case where there is user operation, the processing proceeds to step ST24.

In step ST24, the focal length detected in step ST22 is saved as a focal length at preliminary shooting. Specifically, the control unit 105 records the focal length detected by the focus detection unit 105A in the recording unit 104 as a focal length at preliminary shooting. Then, the processing proceeds to step ST25.

In step ST25, the control unit 105 determines whether or not the processing has ended. For example, it is determined that the processing has ended at the timing when the power of the imaging apparatus 1 is turned off or the focal length recording mode is ended. In a case where it is determined that the processing has ended, the whole processing ends. In a case where it is determined that the processing has not ended, the processing returns to step ST22.

Operation Example in Subsequent Shooting

Figure 4:
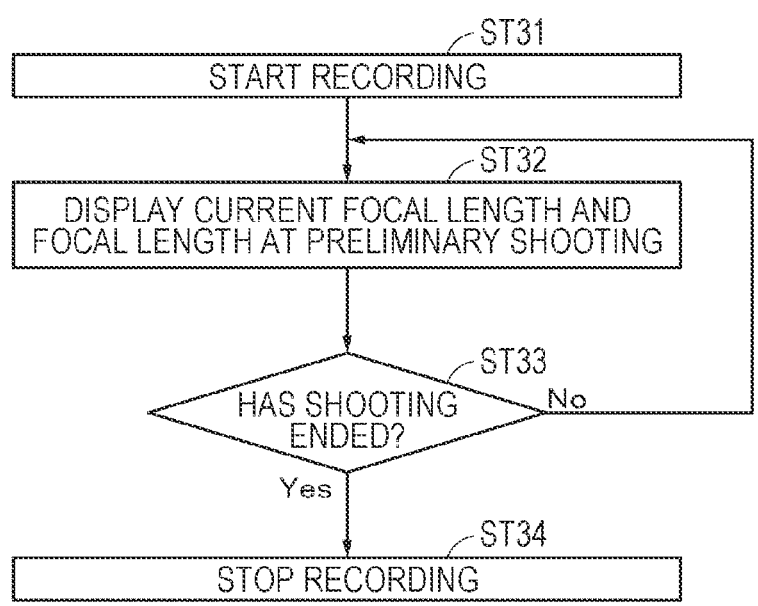
FIG. 4 is a flowchart for explaining a workflow performed by a user at subsequent shooting.

Next, an operation example of the imaging apparatus 1 in subsequent shooting will be described with reference to the flowchart illustrated in FIG. 4. Subsequent shooting is shooting performed after preliminary shooting, and specific examples thereof include real shooting and rehearsal shooting. The flowchart illustrated in FIG. 4 is also a flow of a workflow performed by a focus puller in charge of focusing, for example.

In step ST31, user operation of recording a video is performed. Then, the processing proceeds to step ST32.

In step ST32, a current focal length and a focal length at preliminary shooting are displayed on the display unit 108. The user performs focus operation so that the current focal length matches the focal length at preliminary shooting. Then, the processing proceeds to step ST33.

In step ST33, it is determined whether or not shooting has ended. In a case where shooting has not ended, the processing returns to step ST32. In a case where shooting has ended, the processing proceeds to step ST34.

In step ST34, the user stops the processing of recording the video.

Operation Example of Displaying Current Focal Length and the Like

Figure 5:
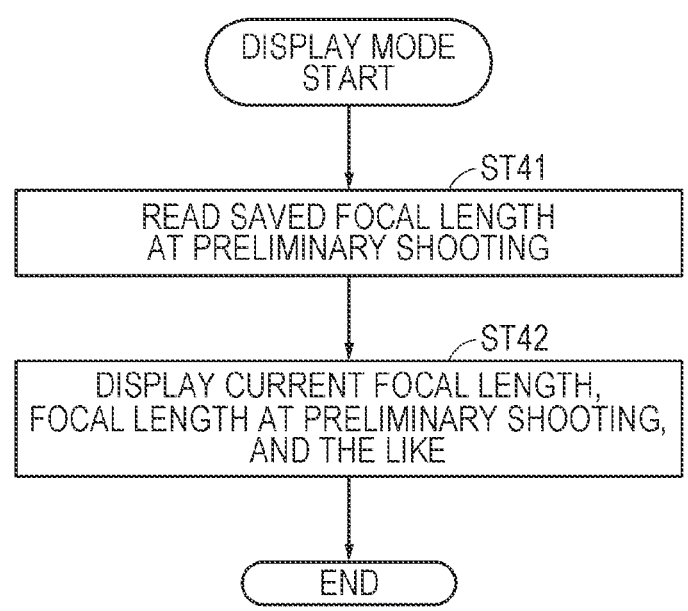

Next, an operation example of displaying a current focal length and the like in the imaging apparatus 1 will be described with reference to the flowchart of FIG. 5. For example, the current focal length and the like are displayed in a case where a display mode of displaying the current focal length and the like is set.

In step ST41, processing of reading the saved focal length at preliminary shooting is performed. For example, the focal length display control unit 105B reads a focal length at preliminary shooting from the recording unit 104. Furthermore, the focal length display control unit 105B acquires a current focal length from the focus detection unit 105A. Then, the processing proceeds to step ST42.

In step ST42, the focal length display control unit 105B performs control to display information including the current focal length and the focal length at preliminary shooting on the display unit 108. Then, the processing ends.

Specific Examples of Display Method of Current Focal Length and Focal Length at Preliminary Shooting First Example Next, specific examples of a display method of a current focal length and a focal length at preliminary shooting will be described. The display method of a current focal length and a focal length at preliminary shooting includes a plurality of display methods, and the focal length display control unit 105B selects at least one of the plurality of display methods. Then, the focal length display control unit 105B executes control for achieving the selected display method. Note that the focal length display control unit 105B may execute control for achieving a display method obtained by combining the plurality of display methods.

Figure 6:
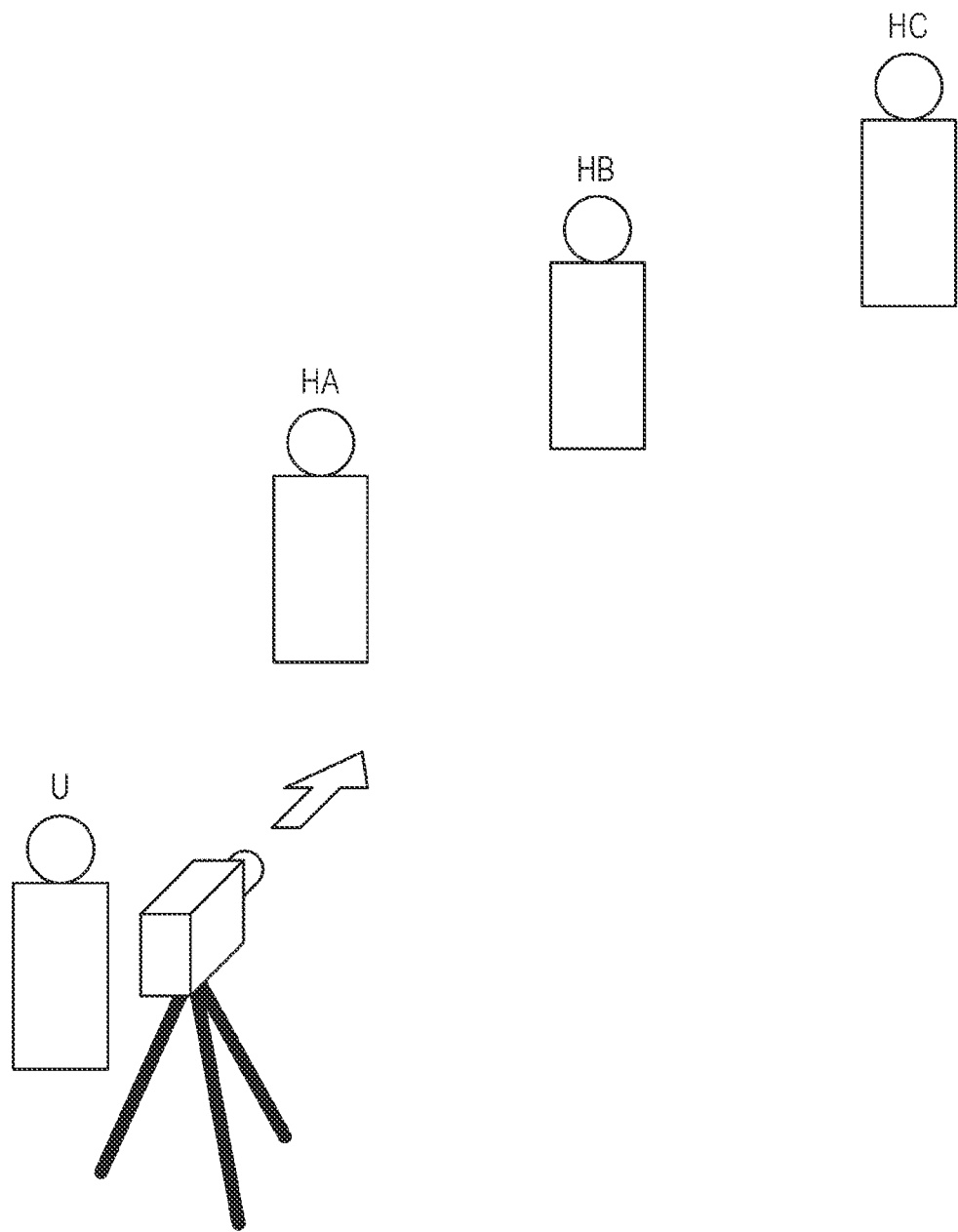
FIG. 6 is a diagram to be referred to in describing a first example of a display method of a current focal length and a focal length at preliminary shooting.

In the first example, as illustrated in FIG. 6, a case where a user (shooter) U changes the focal length from subject HA to subject HB to subject HC at the same angle of view will be considered as an example. The focal length corresponding to the subject HA is focal length at preliminary shooting A, the focal length corresponding to the subject HB is focal length at preliminary shooting B, and the focal length corresponding to the subject HC is focal length at preliminary shooting C.

Figure 7:
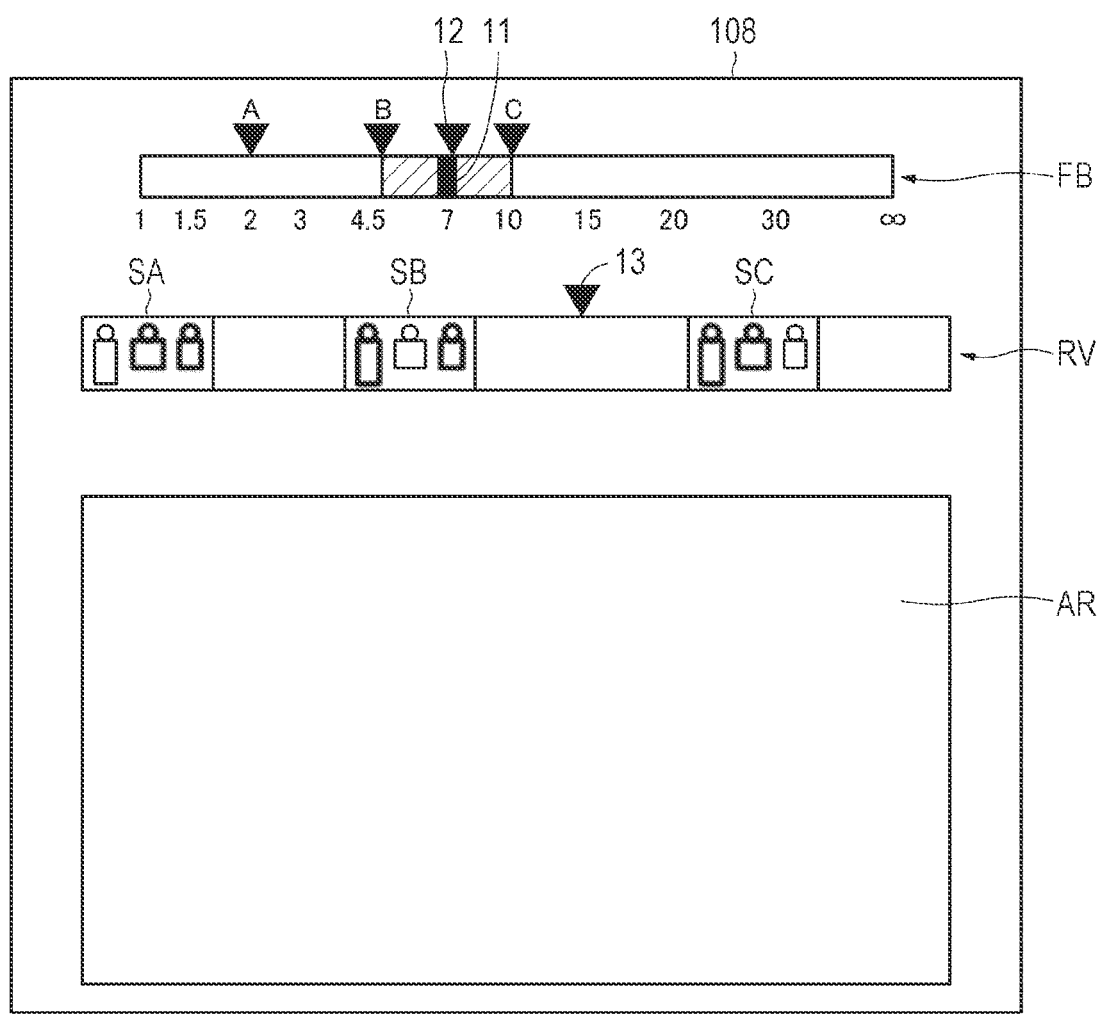
FIG. 7 is a diagram to be referred to in describing the first example of the display method of a current focal length and a focal length at preliminary shooting.

FIG. 7 is a diagram illustrating an example of information displayed on the display unit 108 in the first example. In an area AR on the lower side of the display unit 108 from a part near the center, a currently shot video (image) is displayed. Furthermore, a focus bar FB is displayed on the upper side of the display unit 108, and a rehearsal video RV shot in preliminary shooting (in the present example, rehearsal shooting) is displayed below the focus bar FB.

The focus bar FB indicates a focal length and is a rectangular bar extending in the lateral direction of the display unit 108. The focus bar FB may be a rectangular bar extending in the vertical direction of the display unit 108, or may have a shape other than a rectangle. On the upper side of the focus bar FB, black triangles indicating each of the focal lengths at preliminary shooting A, B, and C are displayed together with order information indicating the order of the focal lengths at preliminary shooting (alphabetical order). The information indicating the order of the focal lengths may be figures instead of alphabets. Furthermore, a mark 11 indicating a current focal length corresponding to the current focal length acquired by the focus detection unit 105A is displayed in the focus bar FB. The mark 11 according to the present example is, for example, a black line extending in the vertical direction, but may be in another display mode.

Furthermore, on the upper side of the focus bar FB, transition information 12 is displayed. The transition information 12 according to the present example is indicated by, for example, a black triangle, but may be in another display mode. The transition information 12 is information indicating the transition of focal length in rehearsal shooting, and moves on the focus bar FB. There is a case where the transition information 12 moves rightward on the focus bar FB, and there is a case where the transition information moves leftward on the focus bar FB. Note that, for example, the transition information can be displayed by recording the focal length in association with each frame of an image obtained at preliminary shooting and reading the focal length associated with each frame when the image obtained at preliminary shooting is reproduced.

When real shooting is started, the video being shot is displayed in the area AR of the display unit 108. Furthermore, shot video data obtained in rehearsal shooting is reproduced from the recording unit 104 by the control unit 105. Furthermore, the focal length for each frame of the shot video data obtained in rehearsal shooting is supplied to the focal length display control unit 105B. The focal length display control unit 105B displays the focal lengths in the upper part of the focus bar FB while moving the display position of the transition information 12 on the basis of such focus position for each frame.

Furthermore, the shot video data obtained in rehearsal shooting is temporally adjusted by the control unit 105, and then displayed on the display unit 108 as the rehearsal video RV by the display control unit 105D. Furthermore, images respectively corresponding to the focal lengths at preliminary shooting A, B, and C are read from the recording unit 104 by the focal length display control unit 105B. For example, the focal length display control unit 105B displays the images respectively corresponding to the focal lengths at preliminary shooting A, B, and C as thumbnail images SA, SB, and SC at predetermined positions of the rehearsal video RV on the basis of the time associated with the images respectively corresponding to the focal lengths at preliminary shooting A, B, and C. An arrow 13 indicating a reproduction position is displayed on the upper side of the rehearsal video RV.

Note that, since it is sufficient if the total video recording time is known from the rehearsal video RV, the video between thumbnail images may be thinned out and displayed, or in a case where the recording time of the rehearsal video RV is very long, the middle part may be omitted and hidden.

The rehearsal video RV is reproduced simultaneously with the start of recording. A user U adjusts the focus position so that the mark 11 indicating a current focal length is matched to the transition information 12.

Note that the focus may be temporarily stopped at each focal length at preliminary shooting. In the case of producing a movie or a drama, since there are many cases where recording is started before the acting start by a director's instruction (for example, an instruction of "action"), instead of the time from the recording start to a focal length, a block capable of voice detection of the acting start by a director's instruction may be provided inside the imaging apparatus 1, and the start point of video may be adjusted between rehearsal and real shooting based on the acting start.

As in the present example, by displaying the transition information 12, a change in focal length similar to that at preliminary shooting can be reproduced in real shooting.

Second Example

Next, a second example will be described. The second example is an example of a display method in consideration of a use case of shooting in news coverage. In the shooting in news coverage, detailed rehearsal is not performed before real shooting, but the camerawork is checked in advance before real shooting. A shot image of a subject as a point to be shot and a focal length at that time are recorded in a memory of the main body of the imaging apparatus 1. Unlike the first example, since the time for moving from the focal length at the time of start of recording to the recorded focal length and the time interval between the focal lengths are not particularly determined, they are set and recorded in the recording unit 104 using the menu screen or the like of the imaging apparatus 1 as a guide in shooting. The focal length at preliminary shooting registered in advance before real shooting and the image corresponding thereto are displayed on the time axis, and for example, a shooter performs focusing such that the focus ring is operated with the focal length at preliminary shooting as a guide and the current focal length is caused to match the focal length at preliminary shooting and stops there.

Figure 8:
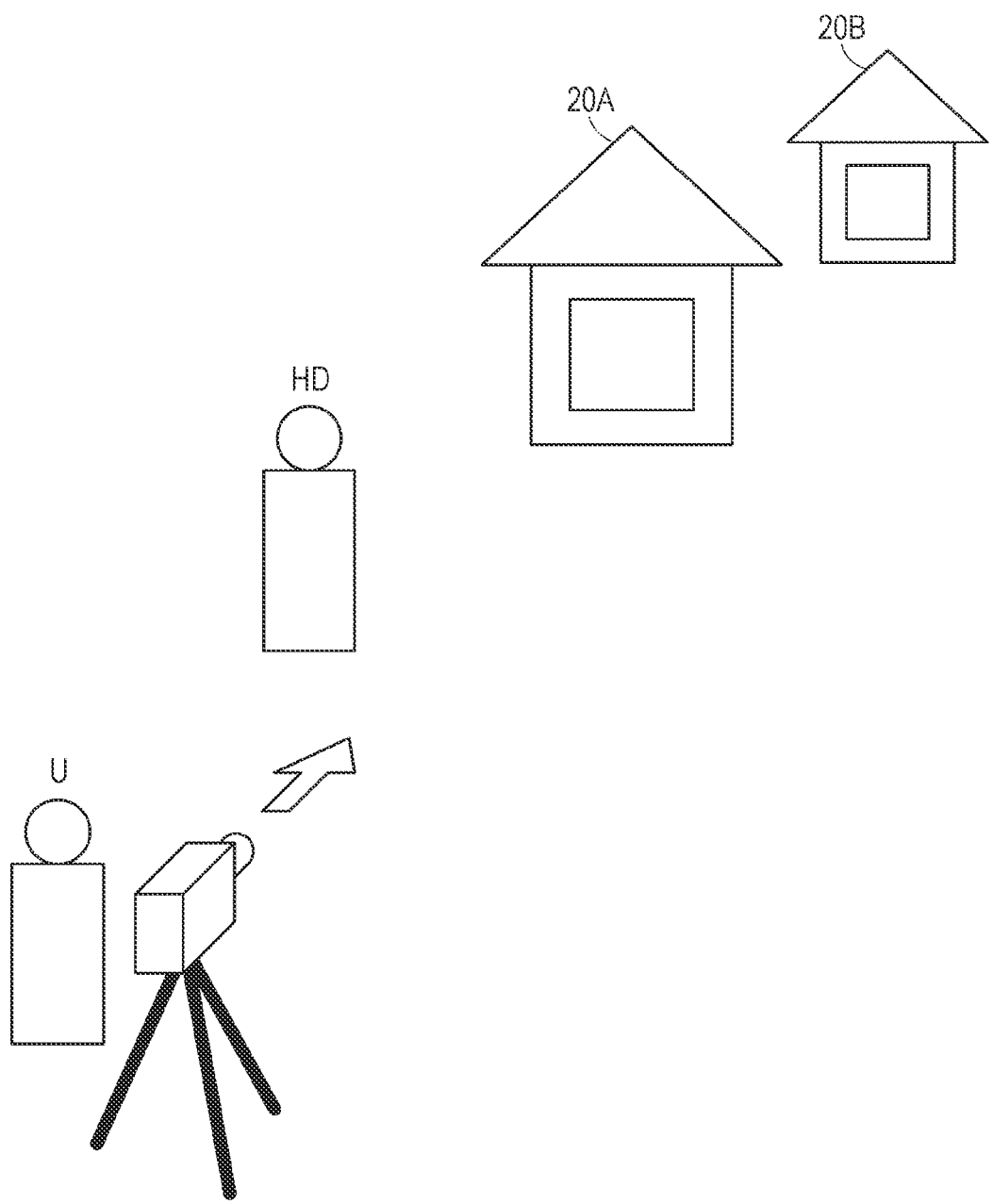
FIG. 8 is a diagram to be referred to in describing a second example of the display method of a current focal length and a focal length at preliminary shooting.

A case where a reporter gives a report on a scene will be described as an example. As illustrated in FIG. 8, the user U first adjusts the angle of view to a reporter HD, and thereafter adjusts the angle of view to a house 20A on the front side and then to a house 20B on the back side. Before real shooting, the user U registers, in association with the angle of view, the focal lengths at preliminary shooting A, B, and C as target positions at which the focus operation is stopped using a menu or an assignable button.

Thereafter, the time corresponding to each focal length at preliminary shooting is acquired by the control unit 105 and registered in association with the focal length at preliminary shooting. For example, the time is acquired on the basis of a counter included in the control unit 105. The user U moves the current focus position so as to be matched to the movement of the focal length at preliminary shooting, and stops the focus operation at each focal length at preliminary shooting.

Figure 9:
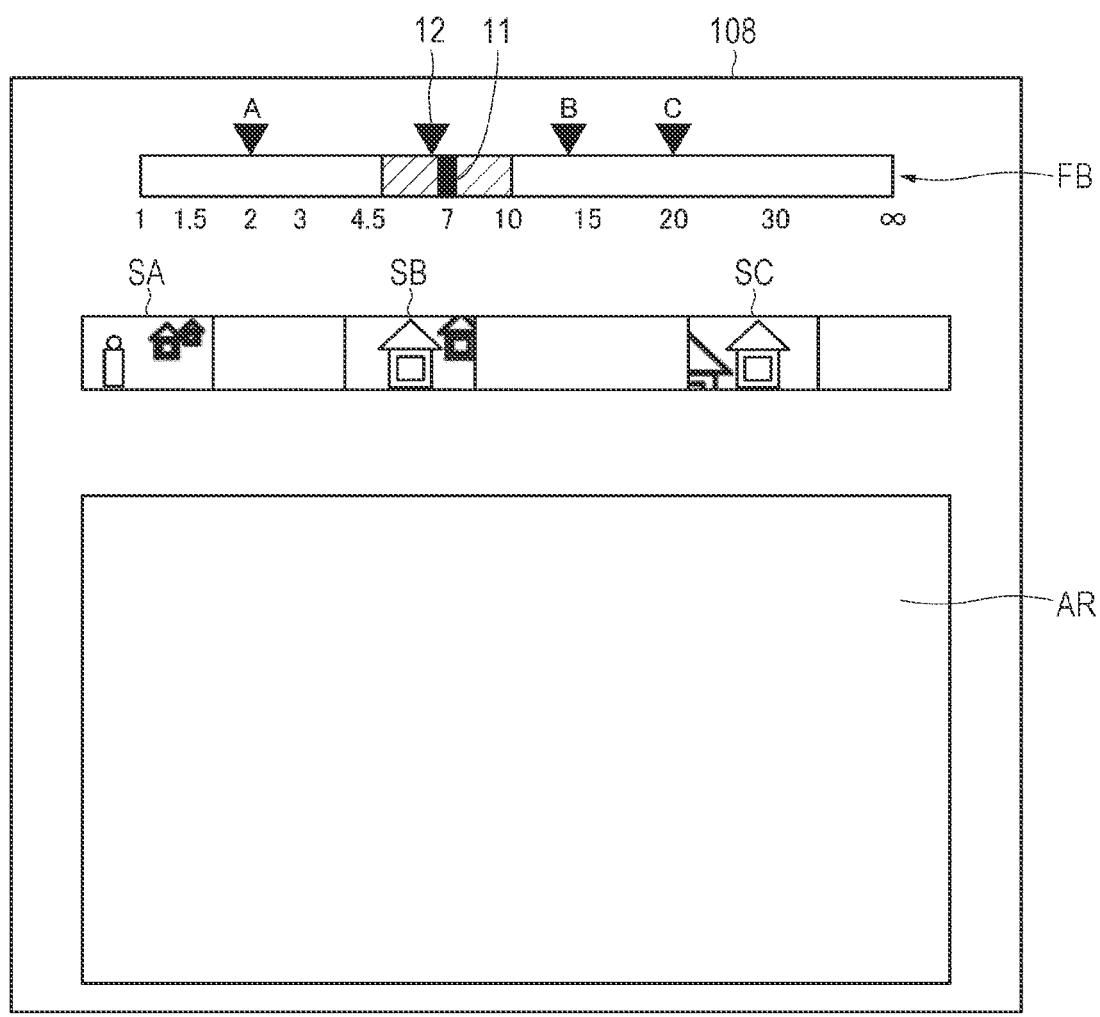
FIG. 9 is a diagram to be referred to in describing the second example of the display method of a current focal length and a focal length at preliminary shooting.

FIG. 9 is a diagram illustrating an example of information displayed on the display unit 108 in the second example. Although it is basically substantially similar to the first example, in the case of news coverage, not the rehearsal video RV but only the thumbnail images SA, SB, and SC corresponding to the respective focal lengths at preliminary shooting are displayed.

Third Example

The present example is an example relating to a display method of thumbnail images displayed together with the focus bar FB. There are cases in which one cannot exactly tell whether the focus is adjusted to the subject on the front side or to the subject on the back side only by a thumbnail image, since the image is too small or there is not much difference in the focusing degree. For this reason, in order to display the subject or part in focus in an easy-to-understand manner, processing of accentuating the subject and part in focus by outline emphasizing or the like and strongly blurring the subject and part not in focus is performed for the thumbnail image. In addition, processing of leaving a color on or adding a color by color peaking or the like to the subject in focus, and lowering a hue of the subject not in focus to make it close to black and white or completely black and white is performed. By performing the above processing, a user can easily recognize the subject and part in focus even in a small thumbnail image.

For example, in a case where there are two flowers on the front side and the back side, the flower on the front side is in focus at the focal length at preliminary shooting A, and the flower on the back side is in focus at the focal length at preliminary shooting B. In this case, for the thumbnail images displayed in real shooting, the flower on the front side in the thumbnail image SA corresponding to the focal length at preliminary shooting A is emphasized as illustrated in FIG. 10A, and the flower on the back side in the thumbnail image SB corresponding to the focal length at preliminary shooting B is emphasized as illustrated in FIG. 10B.

Figure 10A:
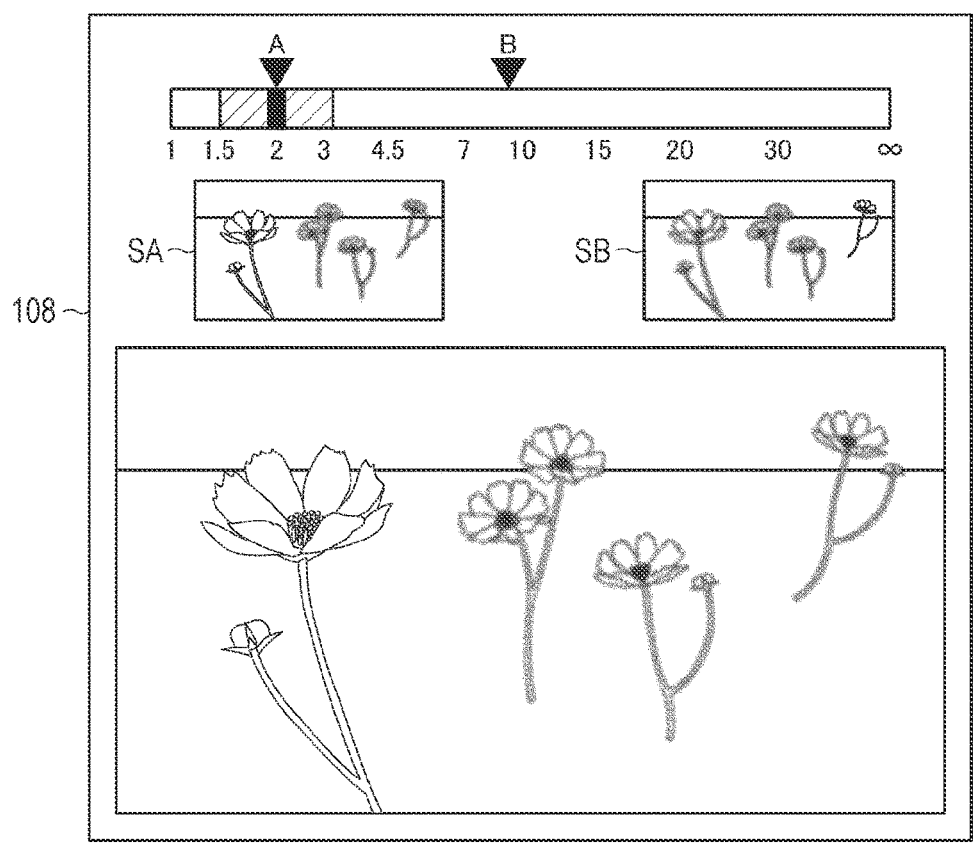
FIGS. 10A and 10B are diagrams to be referred to in describing a third example of the display method of a current focal length and a focal length at preliminary shooting.
Figure 10B:
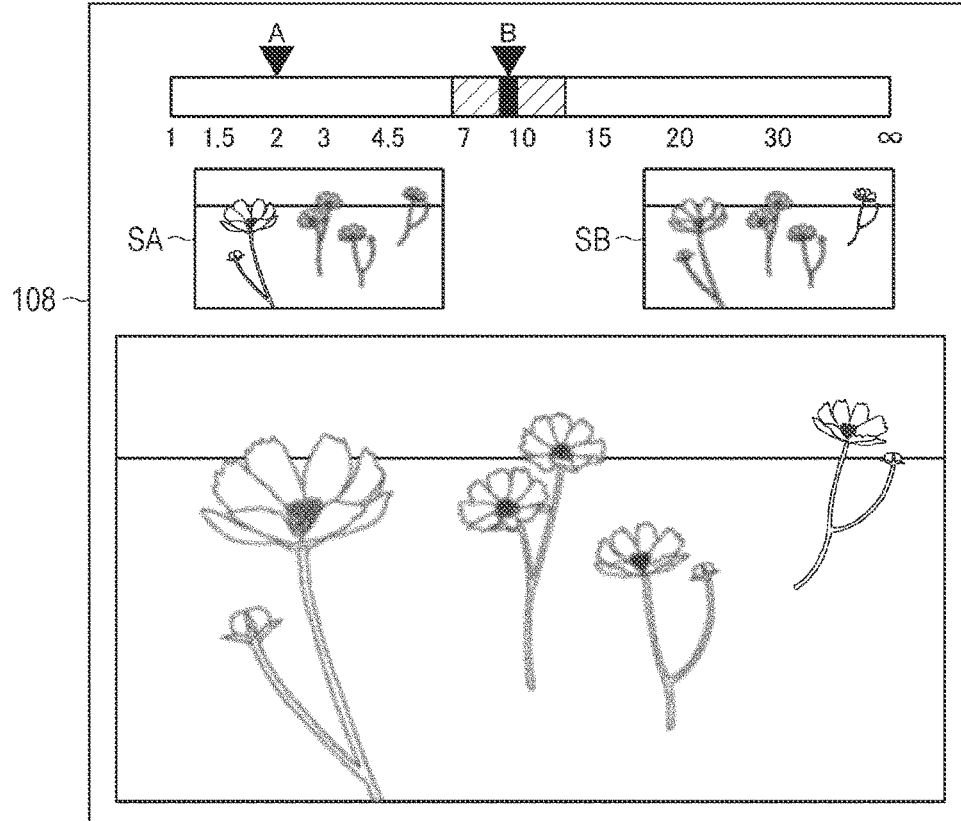

For example, generation of the thumbnail images illustrated in FIGS. 10A and 10B is performed by the display control unit 105D. Since the angle of view and the position of a subject in the video read from the recording unit 104 substantially match those in the shot image, the display control unit 105D generates thumbnail images after performing emphasizing of focus or defocus on the image data associated with the focal length in the rehearsal video RV. The generated thumbnail images are displayed together with the video being shot.

Fourth Example

Figure 11:
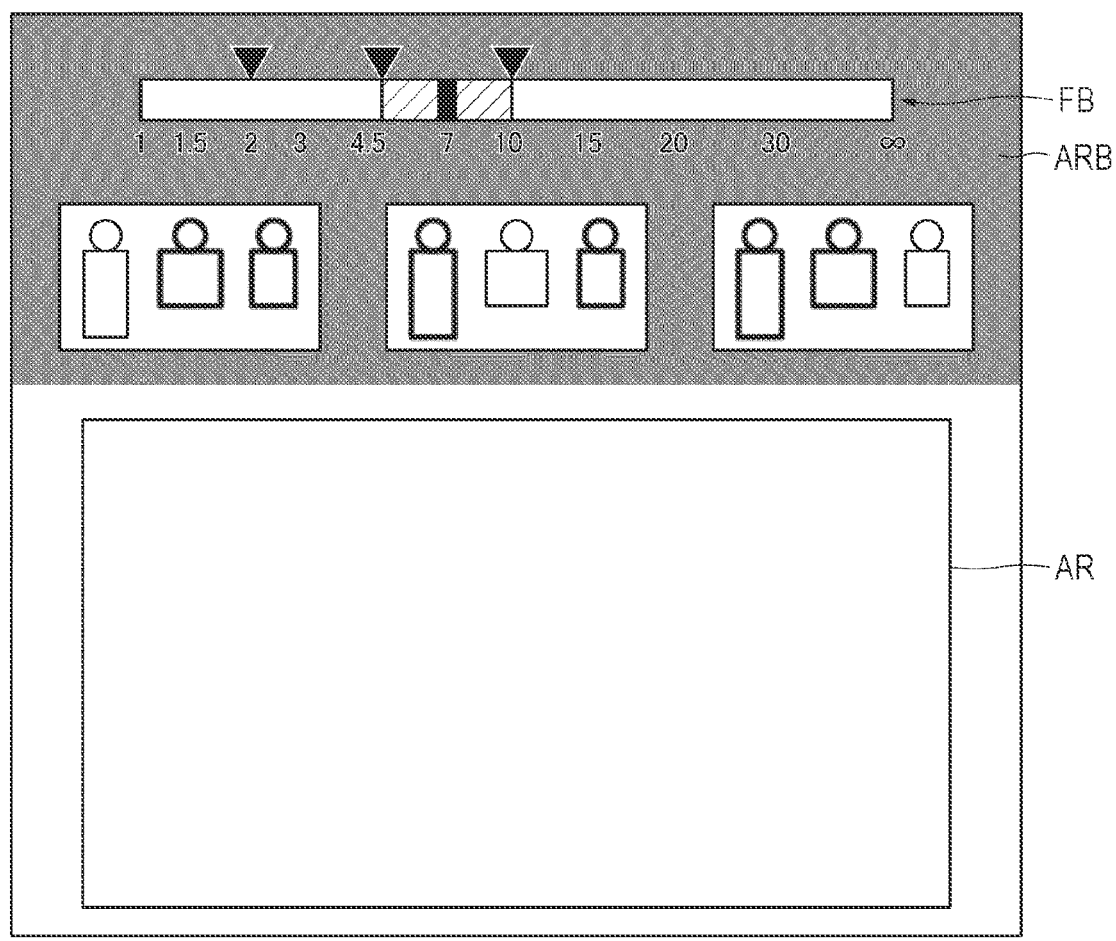
FIG. 11 is a diagram to be referred to in describing a fourth example of the display method of a current focal length and a focal length at preliminary shooting.

Next, a fourth example of the display method will be described. Depending on the aspect size of an imaged effective image, there is a case where the outside of the effective image is a black image when the display image displayed on the display unit 108 is viewed. As illustrated in FIG. 11, the thumbnail images in the above-described example can be displayed in a black image area ARB. For example, in shooting of a movie, there is a case where shooting is performed with a horizontally long aspect such as 2.4:1, and there is a case where, when the display unit 108 of 16:9 is used, display is performed by letterboxing with black images being inserted above and below. By displaying thumbnail images in the upper and lower black image areas, it is possible to simultaneously display the video of the effective area and the thumbnail images.

A thumbnail image is easily associated with an image corresponding to each focal length at preliminary shooting in a case where there is a plurality of focal lengths at preliminary shooting. However, a case where there is one focal length, or a case where a thumbnail image is associated with a subject in the head of the user U and the thumbnail image is unnecessary, is a possible case. In view of the above, thumbnail images may be hidden.

Fifth Example

Figure 12:
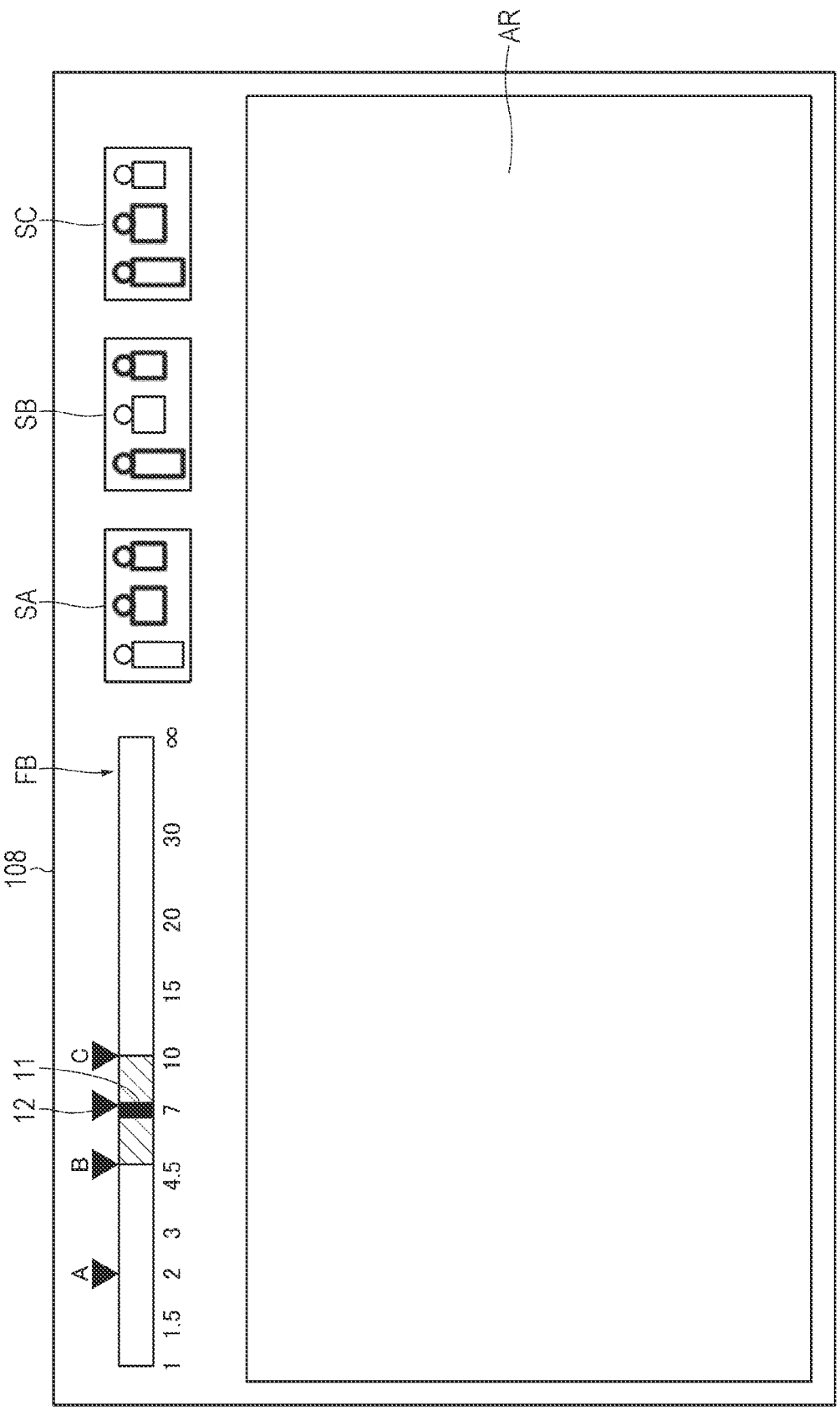
FIG. 12 is a diagram to be referred to in describing a fifth example of the display method of a current focal length and a focal length at preliminary shooting.

Next, a fifth example of the display method will be described. In the examples illustrated in FIGS. 7 and 9, display is performed below the focus bar FB, that is, side by side in the vertical direction of the display unit 108. However, as illustrated in FIG. 12, display may be performed on the side of the focus bar FB, that is, side by side in the lateral direction of the display unit 108.

In a case where there is no black image area outside the video effective area (area corresponding to the area AR), there is a case where the focus bar FB is displayed in the video effective area. In this case, if thumbnail images are arranged below the focus bar FB, the video displayed in the area AR becomes difficult to see. By arranging the thumbnail images next to the focus bar FB, an area occupied by the focus bar FB and the thumbnail images can be reduced. Control related to such display is performed by the display control unit 105D.

In the case of drama shooting or report shooting, it is also important to indicate a current shooting position with respect to the entire recording time of a rehearsal video. In this case, the position may be displayed with a marker or a character, for example, in a region smaller than a thumbnail image.

Figure 13:
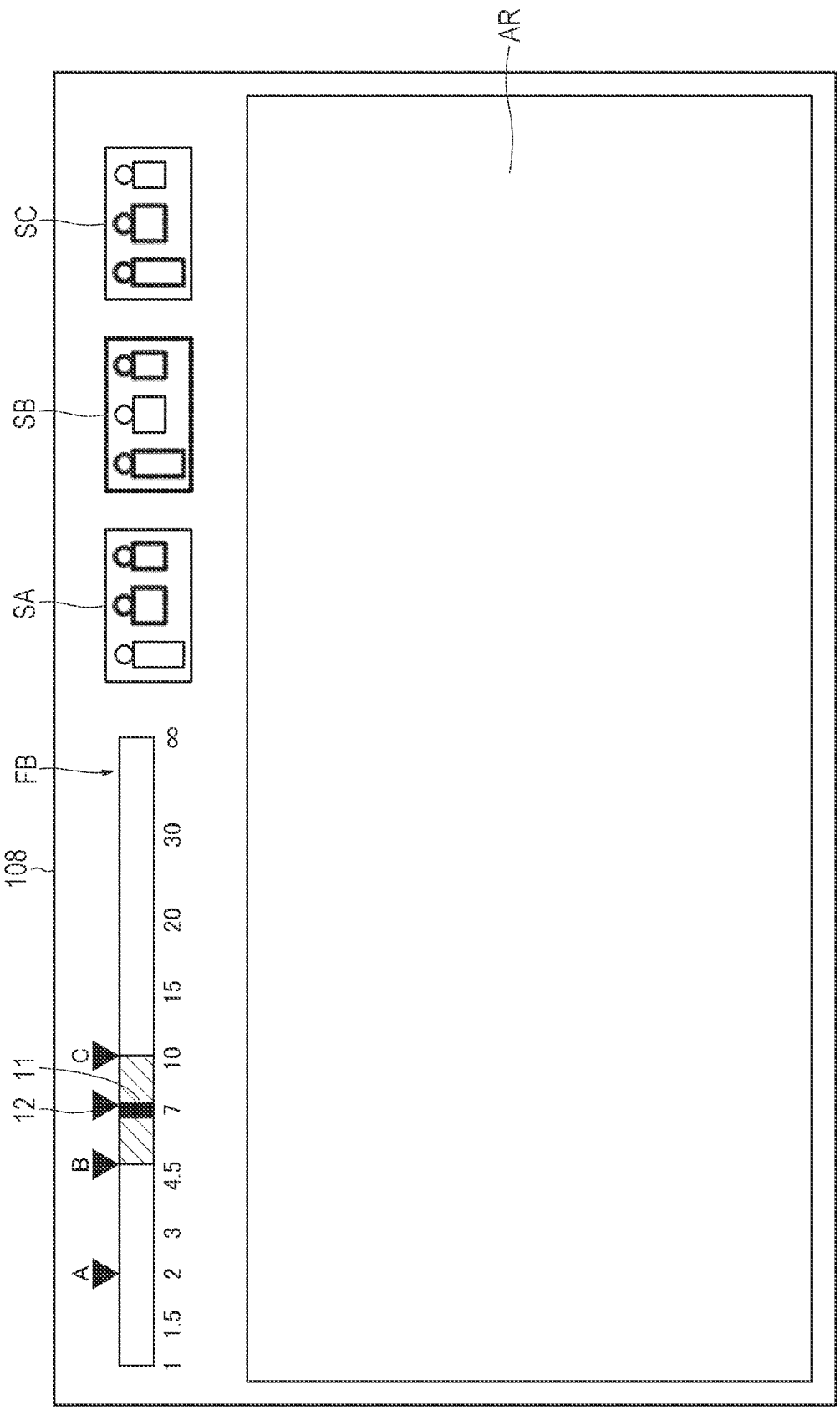
FIG. 13 is a diagram to be referred to in describing the fifth example of the display method of a current focal length and a focal length at preliminary shooting.

Furthermore, with the control of the display control unit 105D, the display mode of thumbnail images may be changed according to the progress of the order of the focal lengths at preliminary shooting to be adjusted. For example, after the timing at which a current focal length is to be set to the focal length at preliminary shooting A, the thumbnail image SB corresponding to the next focal length at preliminary shooting B may be displayed so as to be distinguishable from other thumbnail images. Specifically, as illustrated in FIG. 13, the thumbnail image SB may be displayed so as to be surrounded by a frame of a predetermined color (for example, a red frame). In this case, the thumbnail image SA for which shooting of the focal length has already been performed may be surrounded by a frame of another color (for example, a green frame) and displayed. The color frames allow the user U to recognize the order of the focal lengths to be adjusted. The thumbnail images whose order has already passed may be erased. In a case where a character is displayed at the center of a thumbnail image, since the subject in the image needs to be visually recognized, the character may be displayed translucently.

Note that, in a case where there is no black image area, thumbnail images may be displayed in the effective area as picture-in-picture images.

Sixth Example

Next, a sixth example of the display method will be described. The present example is an example relating to a display method of the focus bar FB. In a case where a difference between the mark 11, which is the current focal length, and a focal length at preliminary shooting is equal to or less than a threshold, a portion including the mark 11 in the focus bar FB may be enlarged and displayed. Determination of whether or not a difference is equal to or less than the threshold and the enlarging and displaying are performed by the focal length display control unit 105B. Some display control may be performed by the display control unit 105D.

Figure 14A:
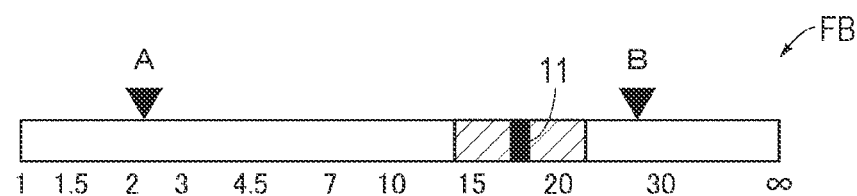
FIGS. 14A and 14B are diagrams to be referred to in describing a sixth example of the display method of a current focal length and a focal length at preliminary shooting.
Figure 14B:
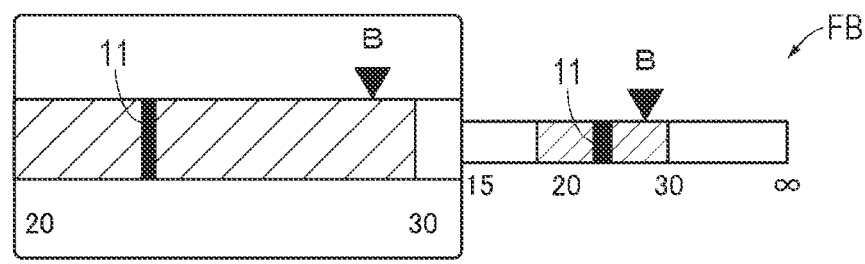

For example, as illustrated in FIG. 14A, the mark 11 approaches the focal length B. In a case where a difference between the mark 11 and the focal length at preliminary shooting B is equal to or less than the threshold, a portion including the mark 11 and the focal length B may be enlarged and displayed as illustrated in FIG. 14B. Note that, for example, the focal length display control unit 105B obtains a difference between the mark 11 and the focal length at preliminary shooting B on the basis of the time corresponding to the mark 11 (for example, time from start of recording) and the elapsed time when the focal length at preliminary shooting B is set, and determines whether or not the obtained difference is equal to or less than the threshold. The display method according to the present example enables fine adjustment of focus to be easily performed when the current focal length approaches a predetermined focal length at preliminary shooting.

Seventh Example

Next, a seventh example of the display method will be described. FIG. 15 is a diagram illustrating a display mode according to the present example. As illustrated in FIG. 15, thumbnail images are not required to be displayed. In a case where thumbnail images are not displayed, since the subject corresponding to each focal length at preliminary shooting is unknown, subjects HA1, HB1, and HC1 in focus at the respective focal lengths at preliminary shooting are surrounded by rectangular frames so that the position of the subject at each focal length at preliminary shooting can be known based on the rehearsal video RV. In this case, the subjects HA, HB1, and HC1 in focus at the respective focal lengths at preliminary shooting at the time of preliminary shooting are recorded in association with the focal lengths at preliminary shooting. The manner of indicating the subjects HA1, HB1, and HC1 may be such that the rehearsal video RV is made translucent and displayed so as to be superimposed on a current shot image. Furthermore, as illustrated in FIG. 15, in the subjects HA1, HB1, and HC1 in current shooting, subjects in focus may be emphasized. For example, processing of displaying the outline of the subject in focus in an emphasized manner or blurring an image portion other than the subject in focus is performed. For example, the processing is performed by the display control unit 105D.

Furthermore, as illustrated in FIG. 15, (1), (2), and (3) may be displayed near respective focal lengths at preliminary shooting in the focus bar FB so that the order of shooting can be known.

Furthermore, focal length transition required time, which is the time required when the focus position is shifted from a first focal length at preliminary shooting registered at first timing at preliminary shooting to a second focal length at preliminary shooting registered at second timing later than the first timing, may be displayed. For example, focal length transition required time 31 measured when the focal length is changed from the focal length A to the focal length B is displayed on the display unit 108. In the example illustrated in FIG. 15, two seconds is displayed on the right side of the focus bar FB as the focal length transition required time 31. With such display, when a current focus position is at the focal length A, the user U can be aware of the quantitative time for the focus position to be moved to the focal length B. Note that, in the case of the present example, the first timing at which the first focal length at preliminary shooting is recorded (for example, elapsed time from the start time of preliminary shooting) is recorded in association with the first focal length at preliminary shooting. The similar applies to the second timing. For example, the focal length display control unit 105B calculates the time between the first timing and the second timing, and displays the calculation result as the focal length transition required time 31.

Furthermore, time 32 measured from the start of shooting to the transition to each focal length at preliminary shooting may be displayed. In the example illustrated in FIG. 15, as the time 32 for transition to each focal length at preliminary shooting, 3 to 6 seconds as time for the transition to the focal length A at preliminary shooting, 8 to 15 seconds as time for the transition to the focal length B at preliminary shooting, and time 20 to 30 seconds as time for the transition to the focal length C at preliminary shooting are displayed.

Eighth Example

Next, an eighth example of the display method will be described. FIG. 16 is a diagram illustrating a display mode according to the present example. In the present example, the focal lengths are displayed not only in the focus bar FB but also in a graph.

As illustrated in FIG. 16, for example, graph G is a graph in which the vertical axis represents focus position and the horizontal axis represents time. Unlike FIG. 15, the speed of change in focal length is indicated by the gradient (inclination) of graph G. On the line of graph G, for example, two circular marks 41 and 42 moving on the line of graph G are displayed. The mark 41 is a display corresponding to the mark 11, and the mark 42 is a mark corresponding to the current focal length. The user U is only required to adjust the focus so that the mark 41 is matched to the mark 42. At this time, it is only required to adjust the speed of movement of the focus position according to the gradient of graph G. For example, graph G is largely superimposed on the subjects that are currently shot.

Ninth Example

Figure 17:
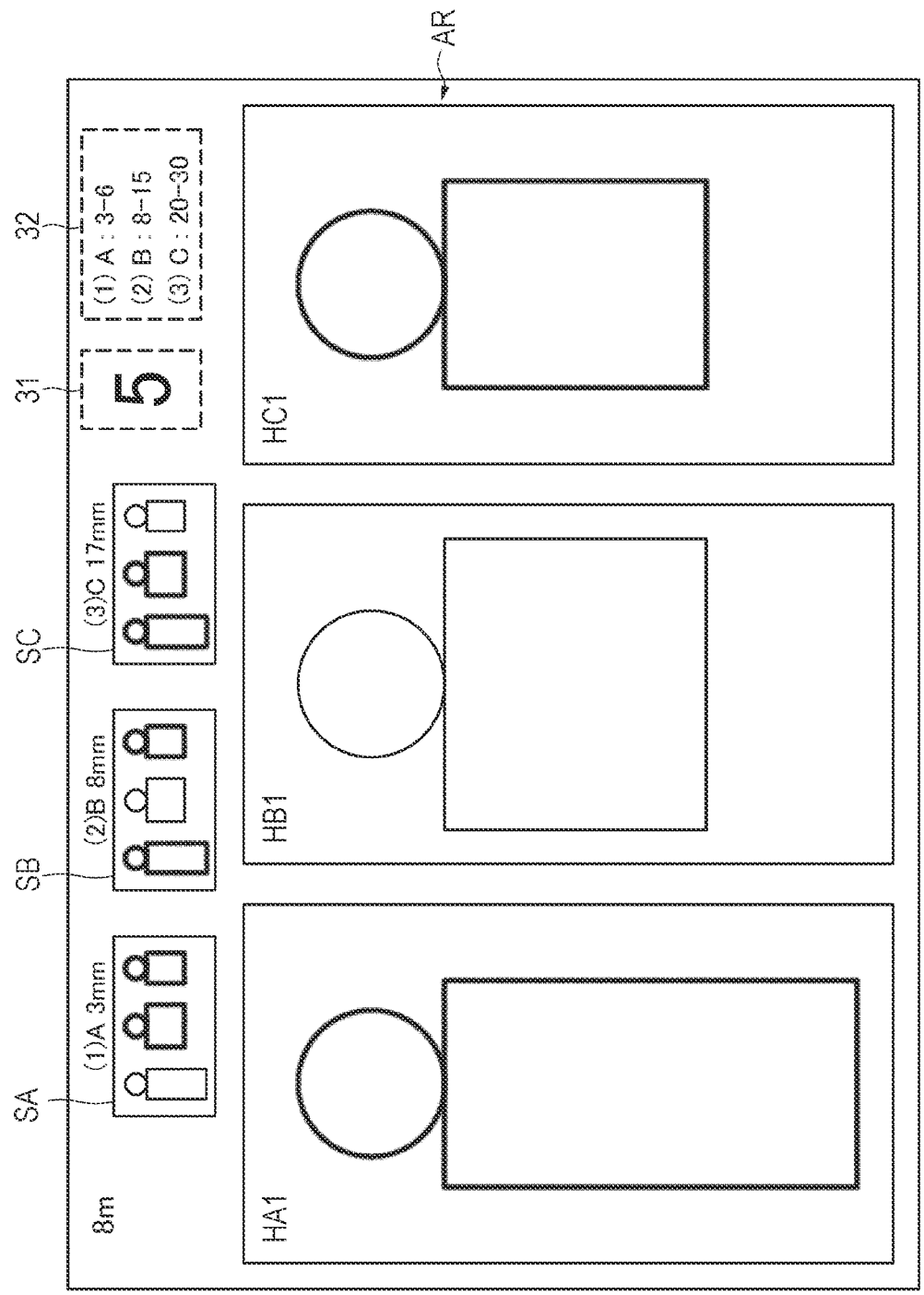
FIG. 17 is a diagram to be referred to in describing a ninth example of the display method of a current focal length and a focal length at preliminary shooting.

Next, a ninth example of the display method will be described. FIG. 17 is a diagram illustrating a display mode according to the present example. In the present example, the focus bar FB is not displayed, and the thumbnail images SA to SB corresponding to the respective focal lengths at preliminary shooting are displayed.

Rectangular frames surrounding the outside of the subjects HA1, HB1, and HC1 illustrated in FIG. 17 indicate subjects to be focal lengths at preliminary shooting. However, in the present example, since the thumbnail images SA to SC are displayed, the frame surrounding the outside of each subject may be hidden.

In the present example, above each thumbnail image, there are a number indicating the order of the focal length at preliminary shooting and the focal length at preliminary shooting at that time indicated by figures. By indicating the focal length at preliminary shooting by figures, the user U can know the required amount of quantitative movement of the current focal length to enable adjustment to the next focal length at preliminary shooting. In the example illustrated in FIG. 17, similarly to the example illustrated in FIG. 15, the focal length transition required time 31 and the time 32 from the start of shooting to the transition to each focal length at preliminary shooting are displayed.

The display elements in the plurality of display methods described above can be combined.

Note that the focal length display control unit 105B may select one of the plurality of display methods described above according to a shooting mode. For example, the shooting modes are shooting modes in which recording formats are different from each other. Specifically, the shooting modes are a shooting mode for drama and cinema and a shooting mode for report and news. The former is generally recorded as RAW data (data recorded in a RAW mode and data recorded without compression or with a compression rate equal to or less than a threshold), and the latter is compressed and recorded in an appropriate format.

A specific example will be described. In the case of shooting of a movie or a drama, there are many cases where a focus puller performs focus operation, and a monitor viewed by the focus puller is a small-sized monitor attached to an upper portion of the imaging apparatus 1 or a medium-sized monitor mounted on a movable tripod. Furthermore, there is also a case where a ranging sensor is connected and an output thereof is superimposed on an imaged image. As described above, since there is a case where the area of a screen where focal lengths and thumbnail images can be displayed and visually recognized is insufficient, it is desirable to provide a menu that enables display switching according to the preference of the user U or to be capable of switching the display by operation with an assignable switch. In view of the above, in a case where a shooting mode is the shooting mode for drama and cinema, the display methods illustrated in FIGS. 12, 13, 15, 16, and 17 are preferable. However, even in the case of shooting of a movie or a drama, in a case where a monitor for focus operation can be a large screen, there is a case where the area for displaying focal lengths at preliminary shooting and thumbnail images at the same time can be secured. Therefore, another display method may be adopted in the case of the shooting mode for drama and cinema.

On the other hand, in the case of news coverage shooting, basically, a camera operator operates the imaging apparatus 1 and the lenses all by himself or herself. At that time, focus operation is performed while viewing a small viewer. For this reason, there is a high possibility that the screen of a monitor is small, and it is desirable to display either focal lengths at preliminary shooting or thumbnail images, or to be capable of display switching for temporarily hiding the display. Furthermore, since the aspect ratio of an effective image area is 16:9 in many cases, it is difficult to display the focal lengths at preliminary shooting and the thumbnail images outside the video effective area as illustrated in FIGS. 12 and 13. In view of the above, in the case of the shooting mode for report and news, for example, the display methods illustrated in FIGS. 15 and 16 in which thumbnail images are not displayed is adopted.

[Switching of Focus Control]

Although it is assumed that manual focus is performed in the adjustment of focus to a focal length at preliminary shooting in the above description, it is also possible to automatically cause movement by autofocus. In a case where it is desired to completely match the focus movement in real shooting to that in rehearsal shooting in the case of drama shooting or the like, autofocus is set in focus setting by the operation on the menu screen or the assignment button, and the focus movement is made automatic. Furthermore, switching of focus control may be performed automatically.

Figure 18:
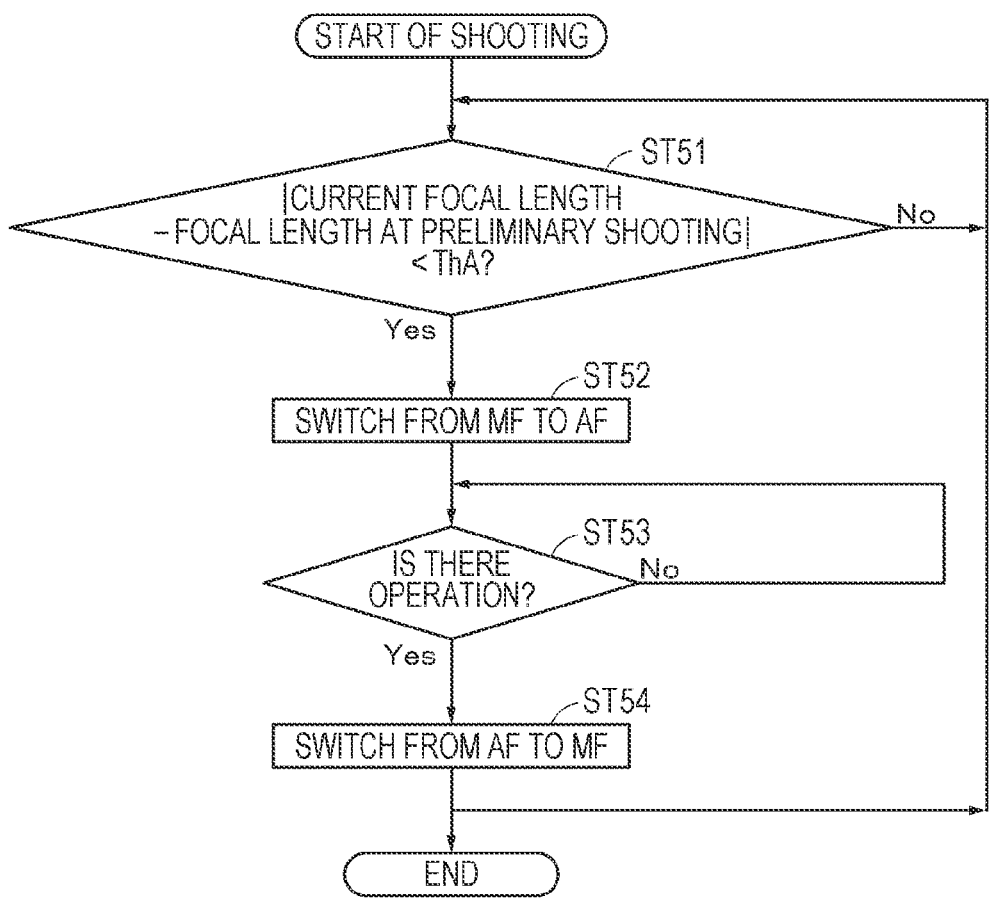
FIG. 18 is a flowchart illustrating a flow of processing of automatically switching focus control.

FIG. 18 is a flowchart illustrating a flow of processing of automatically switching focus control. For example, control of switching of focus control is performed by the control unit 105. Furthermore, description will be given assuming that the focus control at the time when the processing is started is manual control.

In step ST51, the control unit 105 acquires the current focal length acquired by the focus detection unit 105A. Then, the control unit 105 determines whether or not a difference (absolute value) between the current focal length and a focal length at preliminary shooting is smaller than a threshold ThA. In a case where the difference is larger than the threshold ThA (in the case of No), the processing returns to step ST51, and the processing of step ST51 is repeated. In a case where the difference is smaller than the threshold ThA (in the case of Yes), the processing proceeds to step ST52.

In step ST52, the focus control unit 105C switches the focus control from manual focus (MF) to autofocus (AF). The switching to autofocus is made because, in a case where the current focal length approaches a focal length at preliminary shooting, there is a higher possibility that the focal length can be adjusted appropriately with autofocus than with manual focus. Then, the processing proceeds to step ST53.

In step ST53, the presence or absence of the operation of switching the focus control to manual focus is determined by the control unit 105. Examples of such operation include operation of pressing a dedicated switch for switching the focus control and whether the focus ring is touched (specifically, whether a sensor such as a touch sensor provided in the focus ring is touched). In a case where there is no operation, the processing returns to step ST53, and the determination processing of step ST53 is repeated. In a case where there is the operation, the processing proceeds to step ST54.

In step ST54, the focus control unit 105C switches the focus control from autofocus to manual focus. The processing described above is repeated during preliminary shooting such as real shooting. For example, when shooting ends, the above-described processing ends.

Figure 19:
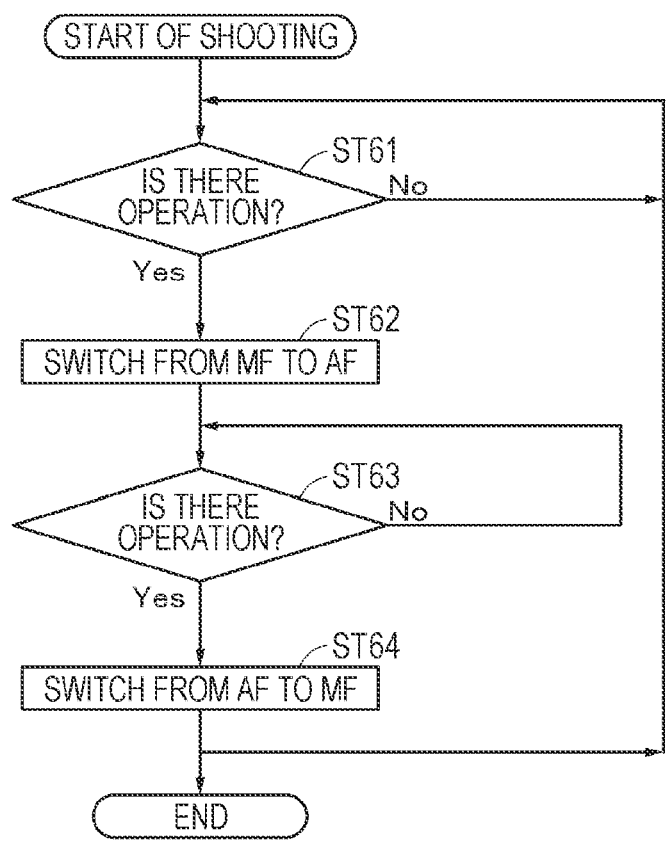
FIG. 19 is a flowchart illustrating a flow of processing performed in response to the operation of manually switching the focus control.

FIG. 19 is a flowchart illustrating a flow of processing performed in response to the operation of manually switching the focus control. In step ST61, the control unit 105 determines the presence or absence of operation. For example, such operation is the operation of pressing by the dedicated switch. The operation may be operation in which the focus ring is not touched for a predetermined time or more. In a case where the determination result is No, the processing returns to step ST61, and the determination processing of step ST61 is repeated. In a case where the determination result is Yes, the processing proceeds to step ST62.

In step ST62, the focus control unit 105C switches the focus control from manual focus to autofocus. Then, the processing proceeds to step ST63.

In step ST63, the control unit 105 determines the presence or absence of operation. Such operation is the same as the operation for which the presence or absence is determined in step ST61. In a case where the determination result is No, the processing returns to step ST63, and the determination processing of step ST63 is repeated. In a case where the determination result is Yes, the processing proceeds to step ST64.

In step ST64, the focus control unit 105C switches the focus control from autofocus to manual focus. The processing described above is repeated during preliminary shooting such as real shooting. For example, when shooting ends, the processing ends.

In the processing described above, in a case where a function such as a touch sensor is incorporated in the focus ring, manual focus operation may be performed while the focus ring is being touched, and autofocus operation may be performed when the hand is released from the focus ring. As a result, an advantage is obtained in which it is not necessary to perform button operation using another finger in addition to the operation of the focus ring.

Effects Obtained by the Present Embodiment

According to the present embodiment, for example, the following effects can be obtained.

A more user-friendly display can be performed for the focus at the time of rehearsal.

Although the performance of autofocus has been improving recently, it is difficult to perform focusing intended by a shooter only with autofocus. Particularly, in production of a movie or a drama, focusing is one of video representations of a video producer, and is changed depending on a shooting scene such as slowly focusing or quickly focusing on a subject, and it is difficult to incorporate an intention of the producer into autofocus operation every time or to obtain the same reproducibility of focus operation and accuracy of focusing as those at rehearsal. Furthermore, in recent years, regardless of a shooting workflow, there have been increasing cases where shooting is performed by a combination of a lens with a shallow depth of field and a camera, or a camera mounted with a high-resolution image sensor is used. On the other hand, since the screen of a monitor for shooting attached to a camera is often a small monitor having a low resolution compared to the resolution of the image sensor, it is difficult for a shooter to check the accuracy of focusing. However, according to the present embodiment, for example, since shooting can be performed while checking a plurality of focal lengths and images at that time simultaneously with a shot image, it is possible to enhance the reproducibility of focus operation when focusing is performed manually and accurately adjust the current focal length to a focal length at preliminary shooting.

Furthermore, in the present embodiment, for example, focal lengths at preliminary shooting and images at that time are simultaneously displayed, and the images are displayed so that the in-focus position is easily known even with small thumbnail images. Therefore, in a case where there is a plurality of focal lengths at preliminary shooting, a focal length at preliminary shooting can be easily associated with the subject or part.

Furthermore, in the present embodiment, for example, since a focal length at preliminary shooting and the image at that time can be checked on the same monitor as the shot video viewed by a shooter, a user can easily perform focusing.

Modifications

Although one embodiment of the present disclosure has been specifically described above, the content of the present disclosure is not limited to the above-described one embodiment, and various modifications based on the technical idea of the present disclosure are possible.

First Modification

Figure 20:
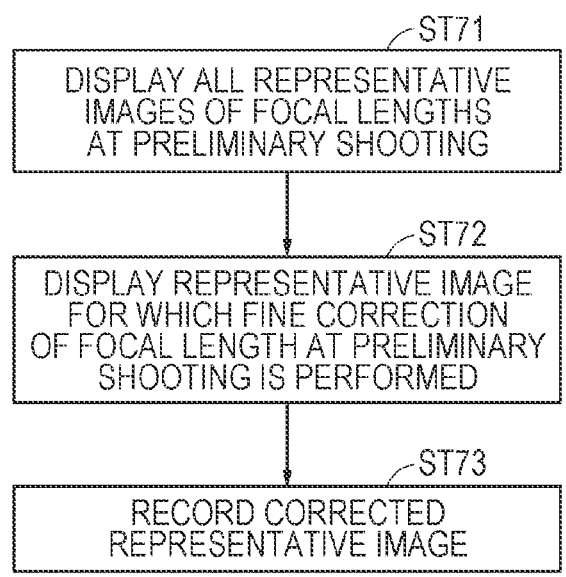
FIG. 20 is a diagram for explaining a modification.

In the above-described embodiment, the registered positions of focal lengths at preliminary shooting and order of focal lengths at preliminary shooting may be changed later. FIG. 20 is a flowchart illustrating a flow of processing performed by the imaging apparatus 1 in response to the operation of correcting a focal length later. For example, the processing illustrated in FIG. 20 is processing performed in a case where a mode for correcting a focal length at preliminary shooting is set.

In step ST71, the control unit 105 reads representative images (for example, thumbnail images) respectively corresponding to a plurality of focal lengths at preliminary shooting recorded in the recording unit 104. The display control unit 105D displays all the read images on the display unit 108. Then, the processing proceeds to step ST72.

In step ST72, the display control unit 105D displays, on the display unit 108, a representative image selected by the user U to be subjected to fine correction. Then, the processing proceeds to step ST73.

In step ST73, the control unit 105 records the corrected representative image in the recording unit 104 in association with the focal length at preliminary shooting associated before correction.

Figure 21:
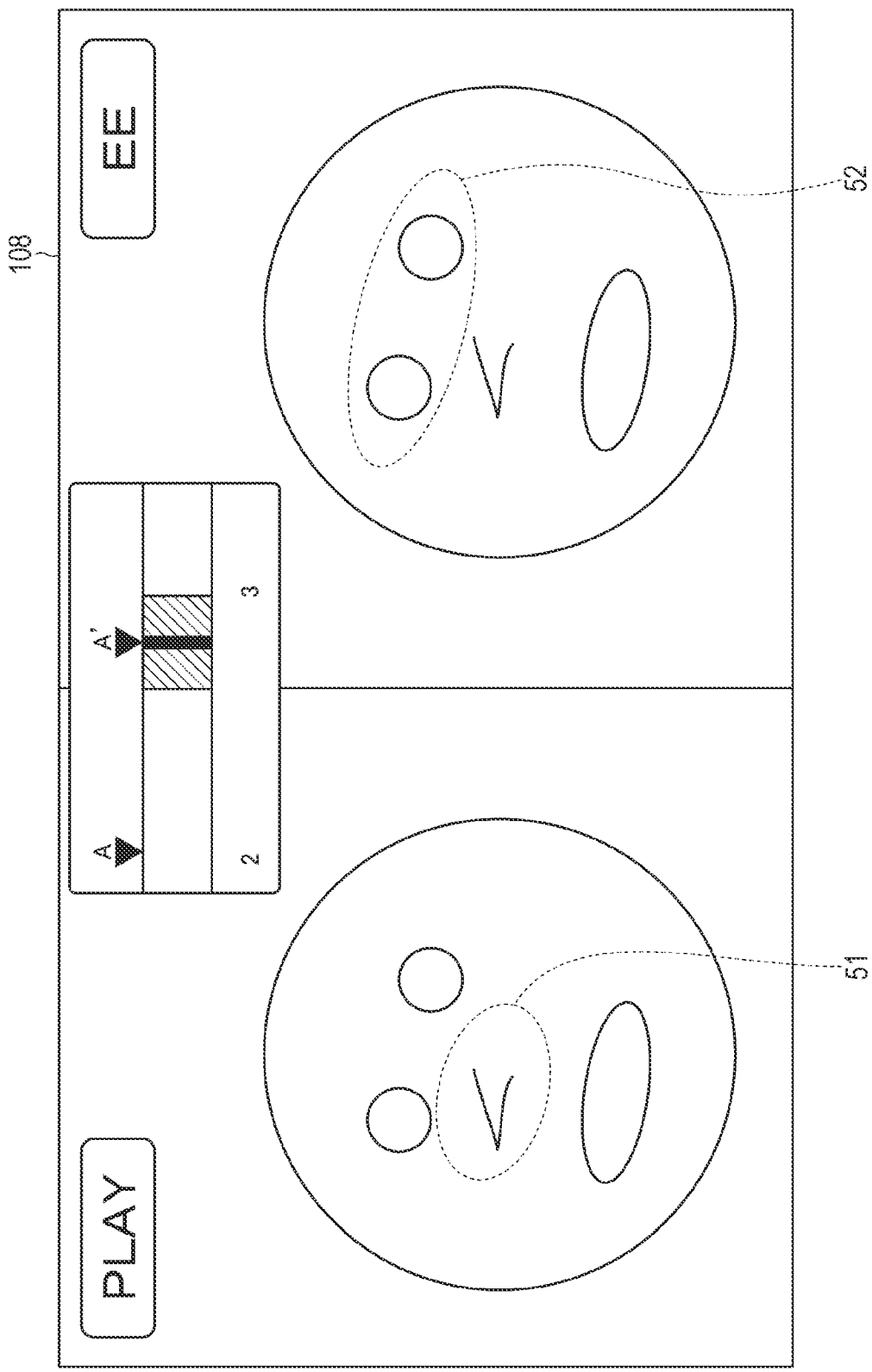
FIG. 21 is a diagram for explaining a modification.

FIG. 21 is a diagram illustrating a specific example of the above-described processing. On the left side in the display unit 108, a thumbnail image corresponding to a predetermined focal length at preliminary shooting is displayed. Such thumbnail image is an image focused on the nose. Furthermore, on the right side in the display unit 108, a currently shot image is displayed. For example, when a user corrects the focal length A from a nose position 51 of a face to an eye position 52, the corrected focal length A' is recorded in the recording unit 104.

Second Modification

It is also assumed that a case occurs in which the position of a subject of the imaging apparatus 1 currently shooting a drama or a movie does not match the position of the subject at preliminary shooting such as at rehearsal shooting. By automatically detecting, in terms of voice and video, a shooting start timing instruction based on the sound of a clapperboard used at the start of shooting of a movie or a drama, or a video or the voice of a director, video synchronization of subjects between a rehearsal video and a currently shot video is achieved. Moreover, delay adjustment is performed in units of frames.

In a case where a currently shot video is significantly different from a rehearsal video due to a change in the acting performance of an acting person or a change in the shooting environment, the focal length also changes. In such a case, an alarm display such as adding color to the outer frame of a screen to cause blinking may be displayed so that the person who is shooting can be aware of a change in the angle of view and a change in the subject.

Figure 22:
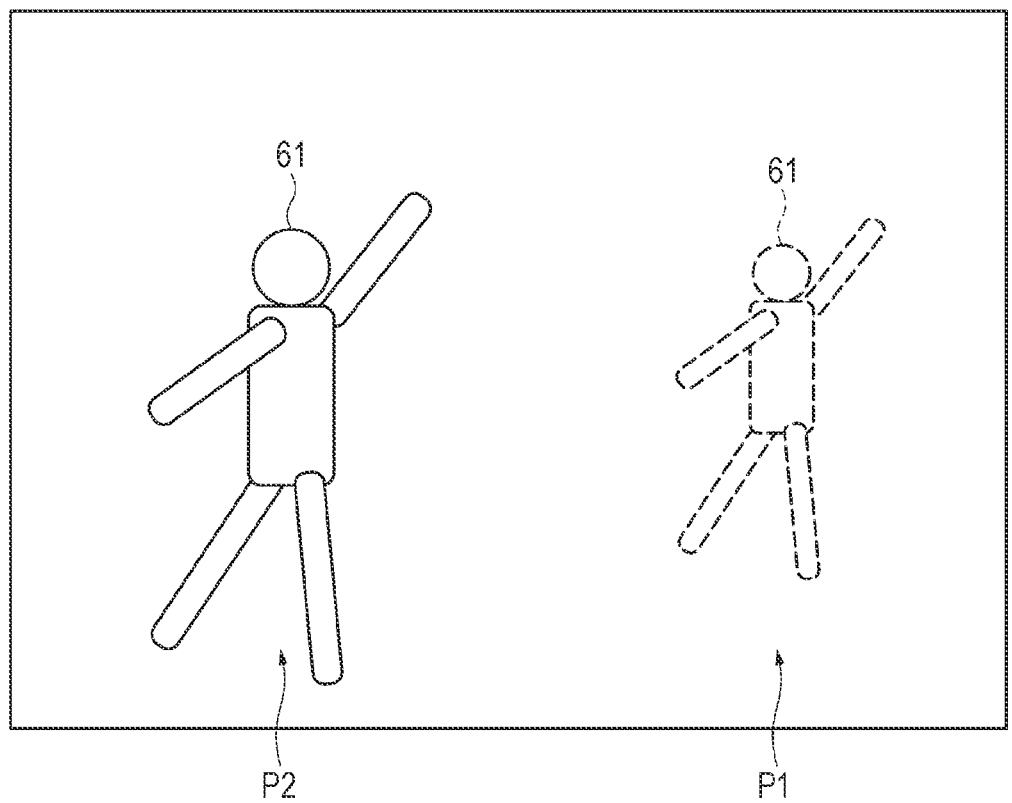
FIG. 22 is a diagram for explaining a modification.

For example, as illustrated in FIG. 22, the position of an acting person 61 at the time of rehearsal is position P1, and the position of the acting person 61 in the current shooting is position P2. For example, the recognition unit 107 recognizes each of the positions P1 and P2 by performing subject recognition, and sends the recognition result to the control unit 105. The control unit 105 may display an alarm display in a case where it is determined that the position P1 and the position P2 transmitted from the recognition unit 107 are separated by a threshold or more.

Note that, since there is a case where a shooter intentionally changes the shooting angle of view or the subject from that at the time of rehearsal, a user interface for updating the original rehearsal video after shooting may be provided. Furthermore, in a case where a gyro sensor or a global navigation satellite system (GNSS) is mounted on the imaging apparatus 1, the shooting position and the shooting direction of the imaging apparatus 1 are known. Therefore, if recording is performed as metadata of the shooting position and the shooting direction at the time of rehearsal shooting, a difference from the shooting position and the shooting direction of a camera at the time of current shooting can be obtained. An alarm display may be displayed in a case where the difference is as large as a threshold or more.

Furthermore, an alarm display may be displayed in a case where the angle of view of the imaging apparatus 1 currently performing shooting does not match (different by a predetermined value or more) the angle of view at preliminary shooting such as at rehearsal shooting, or an alarm display may be displayed in a case where the position of a subject and the angle of view are different by a predetermined value or more. Furthermore, an alarm display may be displayed in a case where a difference between a current focus position and a focal length is equal to or more than a threshold.

Other Modifications

The configuration of the imaging apparatus according to the above-described embodiment and modifications can be changed as appropriate. Furthermore, part of processing in the imaging apparatus may be performed by a server device or the like on a cloud.

The configurations, methods, steps, shapes, materials, numerical values, and the like described in the above-described embodiment and modifications are merely examples. Configurations, methods, steps, shapes, materials, numerical values, and the like different from those described above may be used as necessary, and the above configurations, methods, steps, shapes, materials, numerical values, and the like can be replaced with known ones. Furthermore, the configurations, methods, steps, shapes, materials, numerical values, and the like in the embodiment and modifications can be combined with each other within a range in which no technical contradiction occurs.

Note that the contents of the present disclosure are not to be construed as being limited by the effects exemplified in the present specification.

The present disclosure can also adopt the following configuration.

(1)

An imaging apparatus including a focal length display control unit that performs control to display, on a display unit, a current focal length indicating a current focal length and a plurality of focal lengths at preliminary shooting indicating focal lengths recorded at preliminary shooting and displayed in order of registration at the preliminary shooting.

(2) The imaging apparatus according to (1),
in which a display method of the current focal length and the focal lengths at preliminary shooting includes a plurality of display methods, and the focal length display control unit selects at least one of the plurality of display methods.

(3) The imaging apparatus according to (2),
in which the plurality of display methods includes a display method of displaying the current focal length and the plurality of focal lengths at preliminary shooting by a focus bar.

(4) The imaging apparatus according to (3),
in which the plurality of display methods includes a display method of displaying, together with the focus bar, a plurality of thumbnail images respectively corresponding to the plurality of focal lengths at preliminary shooting.

(5) The imaging apparatus according to (4),
in which a display mode of the thumbnail images is changed according to a progress of the order.

(6) The imaging apparatus according to (2),
in which the plurality of display methods includes a display method of displaying order information indicating an order of the plurality of focal lengths at preliminary shooting.

(7) The imaging apparatus according to (2),
in which the plurality of display methods includes a method for displaying a graph in which a vertical axis represents focus position and a horizontal axis represents time.

(8) The imaging apparatus according to (2),
in which the focal length display control unit selects one of the plurality of display methods according to a shooting mode.

(9) The imaging apparatus according to (8),
in which the shooting mode includes a shooting mode for drama and cinema and a shooting mode for report and news.

(10) The imaging apparatus according to any one of (1) to (9),
in which the focal length display control unit performs control so that a currently shot image is also displayed on a display unit.

(11) The imaging apparatus according to (10),
in which the focal length display control unit performs control to emphasize a subject currently in focus when the currently shot image is displayed on a display unit.

(12) The imaging apparatus according to (11),
in which the focal length display control unit displays an outline of a subject in focus in an emphasized manner or displays an image portion other than a subject in focus after blurring processing.

(13) The imaging apparatus according to (1),
in which the focal length display control unit enlarges and displays a portion of the focus bar including a current focal length and a focal length at preliminary shooting in a case where a difference between the current focal length and the focal length at preliminary shooting is equal to or less than a threshold.

(14) The imaging apparatus according to (1),
in which the focal length display control unit performs control to display focal length transition required time, which is time required when focal length is shifted from a first focal length at preliminary shooting registered at first timing at preliminary shooting to a second focal length at preliminary shooting registered at second timing later than the first timing.

(15) The imaging apparatus according to any one of (1) to (14),
in which the focal length display control unit performs alarm display in a case where a difference between the current focal length and the focal length at preliminary shooting is equal to or more than a threshold.

(16) The imaging apparatus according to any one of (1) to (15),
in which the focal length display control unit performs alarm display in a case where at least one of an angle of view or a position of a subject of a currently shot image is different from that at the preliminary shooting.

(17) The imaging apparatus according to any one of (1) to (16),
in which a focal length recorded at the preliminary shooting and information related to the focal length are stored in association with each other.

(18) The imaging apparatus according to (17),
in which information related to the focal length includes at least one of a thumbnail image corresponding to the focal length or a focal length transition required time.

(19) A method of controlling an imaging apparatus in which a focal length display control unit performs control to display, on a display unit, a current focal length indicating a current focal length and a plurality of focal lengths at preliminary shooting indicating focal lengths recorded at preliminary shooting and displayed in order of registration at the preliminary shooting.

(20) A program for causing a computer to execute a method of controlling an imaging apparatus in which a focal length display control unit performs control to display, on a display unit, a current focal length indicating a current focal length and a plurality of focal lengths at preliminary shooting indicating focal lengths recorded at preliminary shooting and displayed in order of registration at the preliminary shooting.

REFERENCE SIGNS LIST

1 Imaging apparatus
104 Recording unit
105 Control unit
105B Focal length display control unit
108 Display unit

The invention claimed is:

1. An imaging apparatus, comprising
a focal length display control unit configured to:
control display of a current focal length and a plurality of focal lengths at preliminary shooting on a display unit, wherein
the current focal length indicates a focal length of a currently shot image,
the plurality of focal lengths indicates focal lengths recorded at the preliminary shooting,
the plurality of focal lengths is displayed in an order of registration at the preliminary shooting, and
a display method of the current focal length and the focal plurality of lengths at the preliminary shooting includes a plurality of display methods; and
select at least one of the plurality of display methods based on a shooting mode.

2. The imaging apparatus according to claim 1, wherein the plurality of display methods includes a first display method to display the current focal length and the plurality of focal lengths at the preliminary shooting based on a focus bar.

3. The imaging apparatus according to claim 2, wherein the plurality of display methods further includes a second display method to display, together with the focus bar, a plurality of thumbnail images, and
the plurality of thumbnail images respectively corresponds to the plurality of focal lengths at the preliminary shooting.

4. The imaging apparatus according to claim 3, wherein the focal length display control unit is further configured to change a display mode of the plurality of thumbnail images based on a progress of an order of the plurality of focal lengths at the preliminary shooting to be adjusted.

5. The imaging apparatus according to claim 1, wherein the plurality of display methods includes a display method to display order information that indicates an order of the plurality of focal lengths at the preliminary shooting.

6. The imaging apparatus according to claim 1, wherein the plurality of display methods includes a method for displaying to display a graph in which a vertical axis represents focus position and a horizontal axis represents time.

7. The imaging apparatus according to claim 1, wherein the shooting mode includes
a first shooting mode for drama and cinema, and
a second shooting mode for report and news.

8. The imaging apparatus according to claim 1, wherein the focal length display control unit is further configured to control display of the currently shot image on the display unit.

9. The imaging apparatus according to claim 8, wherein the focal length display control unit is further configured to control to emphasize a subject currently in focus based on the currently shot image displayed on the display unit.

10. The imaging apparatus according to claim 9, wherein the focal length display control unit is further configured to display an outline of a subject in focus in an emphasized manner or display an image portion different from the subject in focus after blurring processing.

11. The imaging apparatus according to claim 1, wherein the focal length display control unit is further configured to enlarge and display a portion of a focus bar that includes the current focal length and a focal length at the preliminary shooting,
the portion of the focus bar is enlarged and displayed based on a difference between the current focal length and the focal length at the preliminary shooting that is equal to or less than a threshold, and
the plurality of focal lengths at the preliminary shooting includes the focal length at the preliminary shooting.

12. The imaging apparatus according to claim 1, wherein the focal length display control unit is further configured to control display of focal length transition required time,
the focal length transition required time is time required to shift focal length from a first focal length at the preliminary shooting to a second focal length at the preliminary shooting,
the first focal length at the preliminary shooting is registered at a first timing, and
the second focal length at the preliminary shooting is registered at a second timing later than the first timing.

13. The imaging apparatus according to claim 1, wherein the focal length display control unit is further configured to display an alarm based on a difference between the current focal length and a focal length at the preliminary shooting that is equal to or more than a threshold, and
the plurality of focal lengths at the preliminary shooting includes the focal length at the preliminary shooting.

14. The imaging apparatus according to claim 1, wherein the focal length display control unit is further configured to display alarm based on at least one of an angle of view or a position of a subject of the currently shot image that is different from an angle of view or a position of a subject at the preliminary shooting.

15. The imaging apparatus according to claim 1, wherein a focal length at the preliminary shooting and information related to the focal length at the preliminary shooting are stored in association with each other, and
the plurality of focal lengths at the preliminary shooting includes the focal length at the preliminary shooting.

16. The imaging apparatus according to claim 15, wherein the information related to the focal length at the preliminary shooting includes at least one of a thumbnail image that corresponds to the focal length at the preliminary shooting or a focal length transition required time.

17. A method of controlling an imaging apparatus, comprising:
controlling to display, on a display unit, a current focal length and a plurality of focal lengths at preliminary shooting, wherein
the current focal length indicates a focal length of a currently shot image,
the plurality of focal lengths indicates focal lengths recorded at the preliminary shooting,
the plurality of focal lengths is displayed in an order of registration at the preliminary shooting, and
a display method of the current focal length and the focal plurality of lengths at the preliminary shooting includes a plurality of display methods; and
selecting at least one of the plurality of display methods based on a shooting mode.

18. A non-transitory computer-readable medium having stored thereon computer-executable instructions that, when executed by a computer, cause the computer to execute operations, the operations comprising:
  controlling to display, on a display unit, a current focal length and a plurality of focal lengths at preliminary shooting, wherein
    the current focal length indicates a focal length of a currently shot image,
    the plurality of focal lengths indicates focal lengths recorded at the preliminary shooting,
    the plurality of focal lengths is displayed in an order of registration at the preliminary shooting, and
    a display method of the current focal length and the focal plurality of lengths at the preliminary shooting includes a plurality of display methods; and
  selecting at least one of the plurality of display methods based on a shooting mode.

19. An imaging apparatus, comprising
a focal length display control unit configured to:
  control display of a current focal length and a plurality of focal lengths at preliminary shooting on a display unit, wherein
    the current focal length indicates a focal length of a currently shot image,
    the plurality of focal lengths indicates focal lengths recorded at the preliminary shooting,
    the plurality of focal lengths is displayed in an order of registration at the preliminary shooting,
    a display method of the current focal length and the focal plurality of lengths at the preliminary shooting includes a plurality of display methods,
    the plurality of display methods includes a display method to display the current focal length and the plurality of focal lengths at the preliminary shooting based on a focus bar and a plurality of thumbnail images, and
    the plurality of thumbnail images respectively corresponds to the plurality of focal lengths at the preliminary shooting; and
  select at least one of the plurality of display methods.

20. An imaging apparatus, comprising
a focal length display control unit configured to:
  control display of a current focal length and a plurality of focal lengths at preliminary shooting on a display unit, wherein
    the current focal length indicates a focal length of a currently shot image,
    the plurality of focal lengths indicates focal lengths recorded at the preliminary shooting, and
    the plurality of focal lengths is displayed in an order of registration at the preliminary shooting; and
  control display of focal length transition required time, wherein
    the focal length transition required time is time required to shift focal length from a first focal length at the preliminary shooting to a second focal length at the preliminary shooting,
    the first focal length at the preliminary shooting is registered at a first timing, and
    the second focal length at the preliminary shooting is registered at a second timing later than the first timing.

* * * * *